(12) United States Patent
Girycki et al.

(10) Patent No.: US 11,870,527 B2
(45) Date of Patent: Jan. 9, 2024

(54) WIRELESS COMMUNICATION NETWORK WITH MASTER DISTRIBUTED UNIT AND METHODS FOR USE THEREWITH

(71) Applicants: ISRD Sp. z o.o., Piaseczno (PL); ISN Sp. z o.o., Piaseczno (PL)

(72) Inventors: Adam Girycki, Zabrze (PL); Md Arifur Rahman, Piaseczno (PL); Michal Piotr Pajak, Warsaw (PL); Jakub Piotr Kocot, Warsaw (PL); Adam Dawid Flizikowski, Bydgoszcz (PL); Slawomir Pietrzyk, Piaseczno (PL)

(73) Assignees: ISRD Sp. z o.o., Piaseczno (PL); ISN Sp. z o.o., Piaseczno (PL)

( * ) Notice: Subject to any disclaimer, the term of this patent is extended or adjusted under 35 U.S.C. 154(b) by 0 days.

(21) Appl. No.: 18/156,544

(22) Filed: Jan. 19, 2023

(65) Prior Publication Data

US 2023/0239027 A1    Jul. 27, 2023

Related U.S. Application Data

(60) Provisional application No. 63/301,785, filed on Jan. 21, 2022.

(51) Int. Cl.
*H04B 7/06* (2006.01)
*H04W 72/04* (2023.01)

(52) U.S. Cl.
CPC .......... *H04B 7/0626* (2013.01); *H04W 72/04* (2013.01)

(58) Field of Classification Search
CPC ..... H04B 7/0626; H04B 7/024; H04W 72/04; H04W 88/085; H04W 72/542
See application file for complete search history.

(56) References Cited

U.S. PATENT DOCUMENTS 9,763,282 B2   9/2017  Pelletier
9,854,597 B2  12/2017  Chen
(Continued)

FOREIGN PATENT DOCUMENTS

CN  102752765 A  10/2012
CN  102804831     11/2012
(Continued)

OTHER PUBLICATIONS

Zhang, X., Chang, T.H., Liu, Y.F., Shen, C. and Zhu, G., 2019. Max-min fairness user scheduling and power allocation in full-duplex OFDMA systems. IEEE Transactions on Wireless Communications, 18(6), pp. 3078-3092.
(Continued)

*Primary Examiner* — John D Blanton
(74) *Attorney, Agent, or Firm* — Garlick & Markison; Bruce E. Stuckman

(57) ABSTRACT

A radio access network operates by obtaining, at a scheduler, CSI corresponding to a plurality of RUs associated with a master DU and another plurality of RUs associated with at least one other DU, wherein the CSI associated with the another plurality of RUs is obtained via another scheduler or via the at least one other DU; allocating, based on the CSI, a resource allocation for resource blocks associated with the plurality of RUs and the another plurality of RUs; negotiating with the another scheduler to obtain PRB resources of RUs controlled by the another scheduler; generating, based on the CSI, precoders associated with the plurality of RUs and the another plurality of RUs; and facilitating, via the master DU and based on the precoders and the resource allocation, contemporaneous transmission to a user equipment UE via the plurality of RUs and the another plurality of RUs and contemporaneous reception from the user equip- (Continued)

ment UE via the plurality of RUs and the another plurality of RUs.

20 Claims, 16 Drawing Sheets

(56) References Cited

U.S. PATENT DOCUMENTS

| | | | |
|---|---|---|---|
| 9,893,774 | B2 | 2/2018 | Shattil |
| 9,918,325 | B2 | 3/2018 | Nguyen |
| 10,440,693 | B2 | 10/2019 | Ghosh |
| 10,779,286 | B2 | 9/2020 | Beattie, Jr. |
| 2014/0315561 | A1 | 10/2014 | Hooli et al. |
| 2016/0113018 | A1 | 4/2016 | Li |
| 2017/0099658 | A1 | 4/2017 | Shattil |
| 2017/0127409 | A1 | 5/2017 | Mishra |
| 2017/0202006 | A1 | 7/2017 | Rao |
| 2019/0069278 | A1* | 2/2019 | Miyamoto ............ H04W 92/16 |
| 2019/0090247 | A1 | 3/2019 | Qvarfordt |
| 2019/0124522 | A1 | 4/2019 | Cao |
| 2020/0137594 | A1 | 4/2020 | Notargiacomo |
| 2020/0252847 | A1 | 8/2020 | Park |
| 2020/0280863 | A1 | 9/2020 | Cioffi |
| 2020/0304362 | A1 | 9/2020 | Palenius |
| 2020/0366341 | A1 | 11/2020 | Lin |
| 2021/0126726 | A1 | 4/2021 | Parkvall |
| 2021/0314975 | A1 | 10/2021 | Barabell |
| 2021/0399854 | A1 | 12/2021 | Carnero |
| 2023/0179640 | A1* | 6/2023 | Qiao ................. H04M 15/8228 709/227 |
| 2023/0269612 | A1* | 8/2023 | Muruganathan ...... H04L 1/0027 370/252 |

FOREIGN PATENT DOCUMENTS

| | | |
|---|---|---|
| CN | 103404197 | 11/2013 |
| EP | 2849524 | 3/2017 |
| EP | 3531775 | 8/2019 |
| KR | 1020090044008 A | 5/2009 |
| KR | 101101722 | 1/2012 |
| KR | 20160028970 | 3/2016 |

OTHER PUBLICATIONS

Zhao, N., Liang, Y.C., Niyato, D., Pei, Y., Wu, M. and Jiang, Y., 2019. Deep reinforcement learning for user association and resource allocation in heterogeneous cellular networks. IEEE Transactions on Wireless Communications, 18(11), pp. 5141-5152.
3GPP; 3rd Generation Partnership Project; Technical Specification Group Radio Access Network; Coordinated multi-point operation for LTE physical layer aspects (Release 11); 3GPP TR 36.819 V11.1.0; Dec. 2011; 69 pages.
3GPP; 3rd Generation Partnership Project; Technical Specification Group Radio Access Network; Coordinated multi-point operation for LTE physical layer aspects (Release 11); 3GPP TR 36.819 V11.1.0; Sep. 2013; 70 pages.
A. Khalili, S. Akhlaghi, H. Tabassum and D. W. K. Ng, "Joint User Association and Resource Allocation in the Uplink of Heterogeneous Networks," in IEEE Wireless Communications Letters. doi: 10.1109/LWC.2020.2970696.
Adamuz-Hinojosa, Oscar, et al. "Sharing gNB components in RAN slicing: A perspective from 3GPP/NFV standards." 2019 IEEE Conference on Standards for Communications and Networking (CSCN). IEEE, 2019.
Alba, Alberto Martinez, et al. "A realistic coordinated scheduling scheme for the next-generation RAN." 2018 IEEE Global Communications Conference (GLOBECOM). IEEE, 2018; 7 pages.
Alba, Alberto Martinez, Jorge Humberto Gómez Velasquez, and Wolfgang Kellerer. "An adaptive functional split in 5G networks." IEEE INFOCOM 2019—IEEE Conference on Computer Communications Workshops (INFOCOM WKSHPS). IEEE, 2019; 7 pages.

Björnson, et al. "Making cell-free massive MIMO competitive with MMSE processing and centralized implementation." IEEE Transactions on Wireless Communications 19.1 (2019): 77-90.
Boviz, Dora, et al. "Multi-cell coordination in cloud ran: Architecture and optimization." 2016 International Conference on Wireless Networks and Mobile Communications (WINCOM). IEEE, 2016.
Chen, Zengxian, et al. "Radio resource coordination and scheduling scheme in ultra-dense cloud-based small cell networks." EURASIP Journal on Wireless Communications and Networking 2018.1 (2018): 1-15.
Escudero-Garzas et al.; On the Feasibility of 5G Slice Resource Allocation With Spectral Efficiency: A Probabilistic Characterization; IEEEAccess; Oct. 2019; pp. 151948-151961; vol. 7, 17; DOI: 10.1109/ACCESS.2019.29479 A pp. 151948-151959.
Frank et al.; Cooperative Interference-Aware Joint Scheduling for the 3GPP LTE Uplink; 10.1109/PIMRC.2010.5671678; Oct. 2010; 6 pages.
Gerasimenko, et al.; Cooperative Radio Resource Management in Heterogeneous Cloud Radio Access Networks. IEEE Access; Apr. 13, 2015; vol. 3; pp. 397-406.
Gharsallah et al. "SDN/NFV-based handover management approach for ultradense 5G mobile networks." International Journal of Communication Systems 32.17 (2019): 15 pages.
H. U. Sokun, E. Bedeer, R. H. Gohary and H. Yanikomeroglu, "Fairness-oriented resource allocation for energy efficiency optimization in uplink OFDMA networks," 2018 IEEE Wireless Communications and Networking Conference (WCNC), Barcelona, 2018, pp. 1-6.
Hoang, T.D. and Le, L.B., 2017. Joint prioritized scheduling and resource allocation for OFDMA-based wireless networks. IEEE Transactions on Wireless Communications, 17(1), pp. 310-323.
Huang, Min, and Xu Zhang. "Distributed MAC Scheduling Scheme for C-RAN with Non-Ideal Fronthaul in 5G Networks." 2017 IEEE Wireless Communications and Networking Conference (WCNC). IEEE, 2017; 6 pages.
International Searching Authority; International Search Report and Written Opinion; International Application No. PCT/US2021/072609; dated Mar. 15, 2022; 8 pgs.
International Searching Authority; International Search Report and Written Opinion; International Application No. PCT/US2021/073111; dated Apr. 21, 2022; 9 pgs.
International Searching Authority; International Search Repot and Written Opinion; International Application No. PCT/US2023/060952; dated May 10, 2023; 14 pgs.
Karimi, A., Pedersen, K.I. and Mogensen, P., Aug. 2019 5G URLLC performance analysis of dynamic-point selection multi-user resource allocation. In 2019 16th International Symposium on Wireless Communication Systems (ISWCS) (pp. 379-383). IEEE.
Karimi, Ali, et al. "5G centralized multi-cell scheduling for URLLC: Algorithms and system-level performance." IEEE Access 6 (2018): 72253-72262.
Karimi, Ali, et al. "Centralized joint cell selection and scheduling for improved URLLC performance." 2018 IEEE 29th Annual International Symposium on Personal, Indoor and Mobile Radio Communications (PIMRC). IEEE, 2018; 6 pages.
Karimidehkordi, Ali. "Multi-Service Radio Resource Management for 5G Networks." (2019).
Le, N.T., Tran, L.N., Vu, Q.D. and Jayalath, D., 2019. Energy-efficient resource allocation for OFDMA heterogeneous networks. IEEE Transactions on Communications, 67(10), pp. 7043-7057.
Mehboob et al.; Genetic Algorithms in Wireless Networking: Techniques, Applications, and Issues; arXiv:1411.5323v1 [cs.NI]; Nov. 2014; 27 pgs.
Morancho et al. Coordination strategies for interference management in mimo dense cellular networks. Diss. Universitat Politècnica de Catalunya, 2017; 240 pgs.
Mwakwata, Collins Burton, et al. "Cooperative interference avoidance scheduler for radio resource management in nb-lot systems." 2020 European Conference on Networks and Communications (EuCNC). IEEE, 2020; pp. 154-159.
Ngo, Hien Quoc, et al. "Cell-free massive MIMO versus small cells." IEEE Transactions on Wireless Communications 16.3 (2017): 1834-1850.

(56) References Cited

OTHER PUBLICATIONS

Niu, Binglai, et al. "A dynamic resource sharing mechanism for cloud radio access networks." IEEE Transactions on Wireless Communications 15.12 (2016): 8325-8338.
Niu, Jinping, et al. "Multi-cell cooperative scheduling for uplink SC-FDMA systems." 2013 IEEE 24th Annual International Symposium on Personal, Indoor, and Mobile Radio Communications (PIMCR). IEEE, 2013; pp. 1582-1586.
O-Ran Alliance; O-Ran Working Group 1 Slicing Architecture; O-RAN.WG1.Slicing-Architecture-v03.00, Technical Specification, Nov. 2020; pp. 1-36 and figures A.1.2-1, 3.2.3-1.
O-Ran Alliance; O-Ran Working Group 1, Study on O-Ran Slicing; O-RAN.WG1.Study-on-O-RAN-Slicing-v02.00; Technical Specification; Apr. 2020; pp. 1-28.
Rahman, M.A.; Lee, Y.; Koo, I. Energy-Efficient Power Allocation and Relay Selection Schemes for Relay-Assisted D2D Communications in 5G Wireless Networks. Sensors 2018, 18, 2865.
Rahman, M.A.; Lee, Y.; Koo, I. Joint Relay Selection and Power Allocation through a Genetic Algorithm for Secure Cooperative Cognitive Radio Networks. Sensors 2018, 18, 3934.
Rodoshi, Rehenuma Tasnim, Taewoon Kim, and Wooyeol Choi. "Resource management in cloud radio access network: Conventional and new approaches." Sensors 20.9 (2020): 2708; 32 pages.
S. Pietrzyk and G. J. M. Janssen, "Cooperative Intra-cell Spectrum Reuse Method for OFDMA-based Multiple Access Systems," 2006 International Conference on Microwaves, Radar & Wireless Communications, Krakow, 2006, pp. 630-633, doi: 10.1109/MIKON.2006.4345258.
S. Pietrzyk and G. J. M. Janssen, "Multiuser subcarrier allocation for QoS provision in the OFDMA systems," Proceedings IEEE 56th Vehicular Technology Conference, Vancouver, BC, Canada, 2002, pp. 1077-1081 vol.2, doi: 10.1109/VETECF.2002.1040769.
S. Pietrzyk, "OFDMA for Broadband Wireless Access," Artech House, 2006-250.
Samsung; Network Slicing; Technical White Paper; Apr. 22, 2020; pp. 1-21.
Singh et al. "A survey on resource scheduling in cloud computing: Issues and challenges." Journal of grid computing 14.2 (2016): 217-264.
Sultan, R., Song, L., Seddik, K.G. and Han, Z., 2020. Joint resource management with distributed uplink power control In full-duplex OFDMA networks. IEEE Transactions on Vehicular Technology, 69(3), pp. 2850-2863.
Umesh et al.; Overview of O-RAN Fronthaul Specifications; NTT DOCOMO Technical Journal; Jul. 2019; pp. 46-59; vol. 21, No. 1.
W. K. Lai and J. Liu, "Cell Selection and Resource Allocation in LTE-Advanced Heterogeneous Networks," in IEEE Access, vol. 6, pP. 72978-72991, 2018.
Wei et al. "Multi-Cell Cooperative Scheduling for Network Utility Maximization With User Equipment Side Interference Cancellation." IEEE Transactions on Wireless Communications 17.1 (2017): 619-635.
Xu, Xiaodong, et al. A frameless network architecture for the way forward of C-RAN. China Communications 13.6 (2016): 154-166.
Xu, XiaoDong, et al. Resource pooling for frameless network architecture with adaptive resource allocation. Science China Information Sciences 56.2 (2013): 1-12.
Xu, Xiaodong, et al. SDN based next generation mobile network with service slicing and trials. China Communications 11.2 (2014): 65-77.
Y. Liu, X. Yang, I. C. Wong, Y. Wang and L. Cuthbert, "Evaluation of Game Theory for Centralized Resource Allocation In Multi-Cell Network Slicing," 2019 IEEE 30th Annual International Symposium on Personal, Indoor and Mobile Radio Communications (PIMRC), Istanbul, Turkey, 2019, pp. 1-6.
Yang, Mao, et al. "OpenRAN: a software-defined ran architecture via virtualization." ACM SIGCOMM computer communication review 43.4 (2013): 549-550.
Z. Lin and Y. Liu, "Joint Uplink-Downlink Resource Allocation in OFDMA Cloud Radio Access Networks," 2018 IEEE International Conference on Communications (ICC), Kansas City, MO, 2018, pp. 1-6.

\* cited by examiner

1200

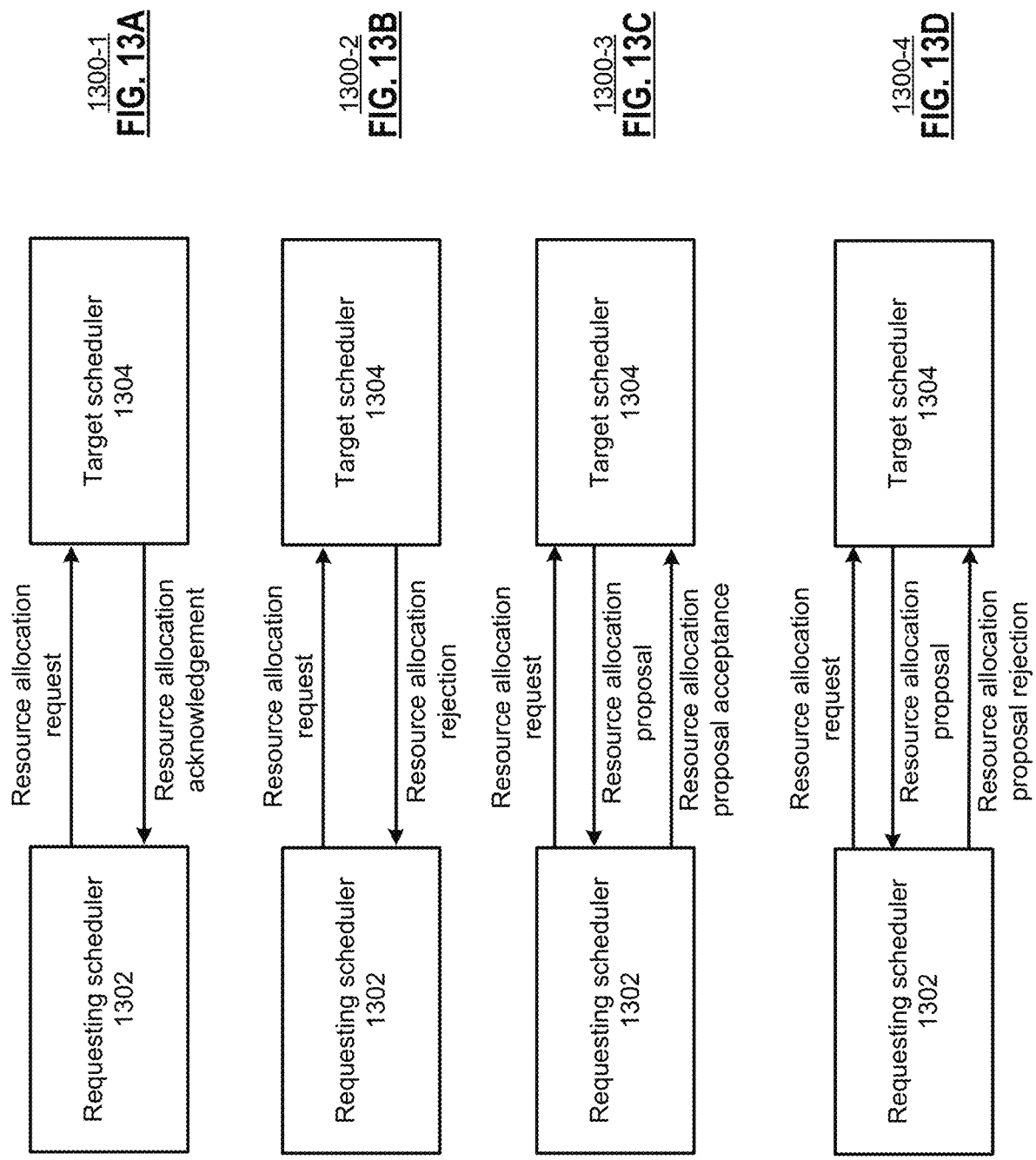

1400-1

1400-2

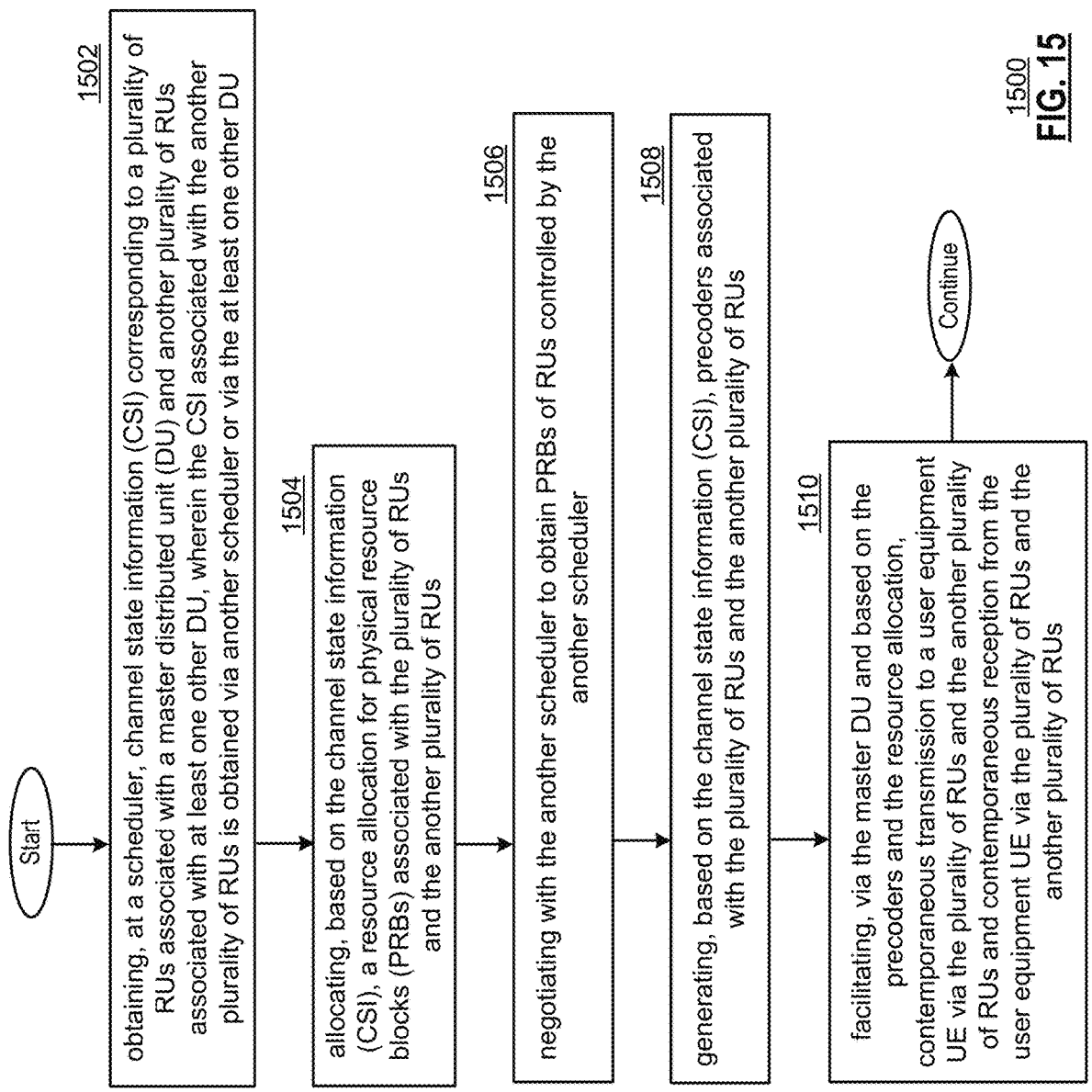

WIRELESS COMMUNICATION NETWORK WITH MASTER DISTRIBUTED UNIT AND METHODS FOR USE THEREWITH

CROSS-REFERENCE TO RELATED APPLICATIONS

The present U.S. Utility Patent Application claims priority pursuant to 35 U.S.C. § 119(e) to U.S. Provisional Application No. 63/301,785, entitled "SIGNAL PERFORMANCE IN A WIRELESS COMMUNICATION NETWORK AND METHODS FOR USE THEREWITH", filed Jan. 21, 2022, which is hereby incorporated herein by reference in its entirety and made part of the present U.S. Utility Patent Application for all purposes.

FIELD OF THE DISCLOSURE

The subject disclosure relates to control of wireless communication networks.

BRIEF DESCRIPTION OF THE DRAWINGS

Reference will now be made to the accompanying drawings, which are not necessarily drawn to scale, and wherein:

FIGS. 13A-13D are block diagrams illustrating example resource negotiations in a radio network.

FIG. 15 is a flow diagram illustrating an example method.

DETAILED DESCRIPTION

Figure 1:
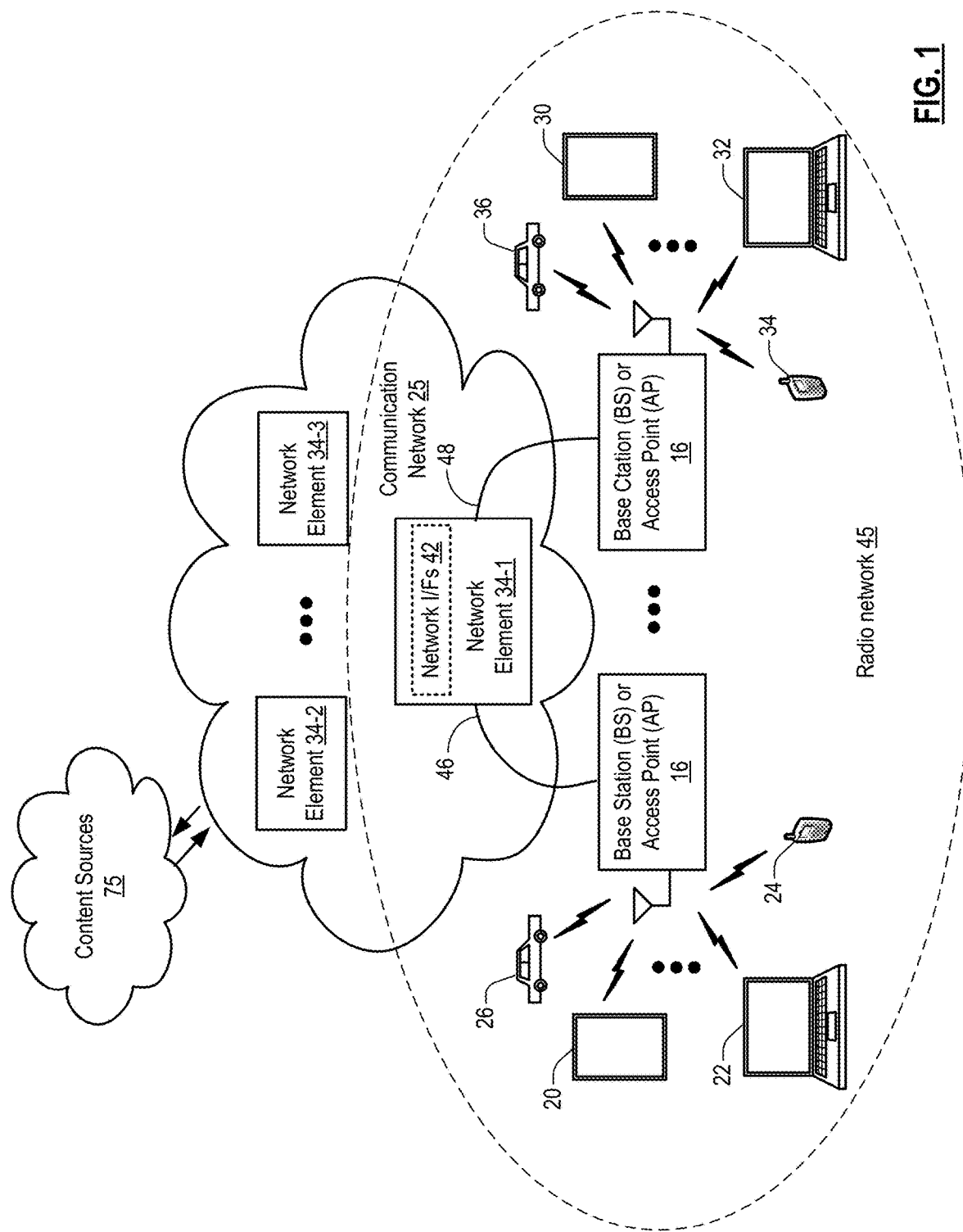
FIG. 1 is a schematic/block diagram illustrating an example of a communications network.

One or more examples are now described with reference to the drawings, wherein like reference numerals are used to refer to similar elements throughout. In the following description, for purposes of explanation, numerous details are set forth in order to provide a thorough understanding of the various examples. It is evident, however, that the various examples can be practiced without these details (and without applying to any particular networked environment or standard).

Referring now to FIG. 1, a schematic/block diagram is shown illustrating an example, of a communications network 25, such as a core communications network (or core) or other wide area network. In particular, the communications network 25 includes a plurality of network elements 34, such as network elements 34-1, 34-2 and 34-3 that are shown.

In various examples, the network elements 34 are interconnected via transport links that can be wired, optical and/or wireless links that, for example, support encapsulated and encrypted transport. The network elements 34 can be implemented, for example, with the use of radio access network (RAN) controllers, RAN intelligent controllers, programmable switches, edge servers, soft switches, network gateways, media distribution hubs, and/or other routers, edge devices, switches, servers or network nodes and combinations thereof that themselves can be implemented via special purpose hardware, and/or via general purpose hardware computing programmed to perform their respective functions.

The communication network 25 operates to support communications including communications via the radio network 45. In operation, the communication network 25 transports data received from content sources 75 or other data content transport clients, and/or data conveying other communications between wireless communication devices. This data can include, e.g., audio, video, graphics, text or other media, applications, control information, billing information, network management information and/or other data. The core communication network 25 also operates to manage access by the wireless communication devices, provides billing and network management and supports other network and control functions.

The wireless communication devices include tablets 20 and 30, laptops 22 and 32, mobile phones 24 and 34, vehicles 26 and 36 including other fixed or mobile communication devices. The wireless communications can include signals formatted in accordance with long term evolution (LTE) 4G, 5G, IEEE 802.11, other orthogonal frequency division multiple access (OFDMA) protocols and/or other wireless signaling. These wireless communications devices can be referred to as client devices or user equipment (UE), regardless of the particular standard used to communicate with these particular devices.

The wireless communication devices communicate with base station or access points 16 to receive services from the communication network 25 that operates as a core network for providing data and voice services and network control functions. Typically, base stations, such as an eNodeB, gNodeB and/or other device, are used for cellular telephone systems and like-type systems, while access points are typically used for in-home or in-building wireless networks. Wireless communication devices communicate directly with a BS or AP 16 via an allocated channel, time slot and/or other physical resource block (PRB) of a radio channel serviced by a plurality of radio units (RUs) that operate in conjunction with baseband processing to convert communications from the communications network 25 into wireless communications of the radio network 45 and vice versa. Regardless of the particular type of communication system, each wireless communication device also includes, or is coupled to, a corresponding radio configured for wireless communications via the radio network 45.

In the example shown, the network element 34-1 includes an edge server, radio access network intelligent controller (RIC) and/or other network element or elements having a plurality of network interfaces (I/Fs) 42. The plurality of network interfaces (I/Fs) 42 can include a wide area network interface for operating over one or more backhaul links with other network elements 34 operating to support data transport. In addition, the network interfaces (I/Fs) 42 can support communications with other network elements 34 operating other portions of the radio network 45. The plurality of network interfaces 42 can further support a plurality of other links 46 and 48, for upstream and downstream communication with a plurality of wireless communications devices over the radio network 45 via BS or APs 16. For example, the network interfaces 42 can include a core network interface configured to communicate network communications with one or more network elements 34 of a core communication network, and a radio network interface configured to communicate communications BS or APs 16 of the radio network 45. These interfaces 42 can operate via F1, E2, A1, O1, evolved packet core (EPC), next generation core (NGC), 5G core or via another network protocol or standard.

The network element 34-1 and BS or AP 16 can be implemented in conjunction with an open radio access network (O-RAN) CRAN, VRAN, DRAN, OpenRan, Open RAN or other standard that is based on interoperability and standardization of RAN element. For example, the network element 34-1 and BS or AP 16 can be implemented in accordance with a unified interconnection standard for white-box hardware and open source software elements from different vendors to provide an architecture that integrates a modular base station software stack on commercial off-the-shelf hardware which allows baseband and radio unit components from discrete suppliers to operate seamlessly together.

While the BS or APs 16 are show schematically as if having a single antenna, the BS or APs 16 each can include a plurality of RUs (such as remote radio heads (RRHs) or other radios, each with one or more antennas) that are supported by processing, such as baseband processing, via a combination of distributed units (DU) and/or centralized units (CU). The network element 34-1 and BS or AP 16 can cooperate and operate in an architecture where the processing via the DU/CU combination support a plurality of RUs with, for example, multiple DUs attaching to a single CU and/or multiple RUs attaching to single DU. The DU and CU can be collocated—but they do not have to be.

In various examples, CUs, DUs and RUs communicate control plane and user plane signaling from the UEs to the core network. The CUs/DUs/RUs operate in conjunction with a radio access network protocol stack that can include a physical (PHY) layer, media access control (MAC) layer, radio link control (RLC) layer and one or more upper layers such as a Packet Data Convergence Protocol (PDCP) layer and a service data adaptation protocol (SDAP) layer.

In a typical wireless network, a modulated Radio Frequency (RF) signal to the UE is sent from antennas of one Radio Unit (RU) connected to one Distributed Unit (DU). The precoder that contains the precoding parameters which are necessary to transmit the signal towards the UE from multiple antennas, is determined by a scheduler located in the DU. The precoder is sent from the scheduler to the RU, where the signals are precoded prior to the transmission.

In various examples disclosed herein, the radio network 45 is densely spaced and a BS or AP 16 can contain not only multiple RUs, but multiple DUs as well. In various embodiments, RF signals can be sent to a single UE from antennas of multiple RUs connected to multiple DUs under control of a scheduler that may be either centralized or distributed. One of the DUs involved in the transmission towards the UE can be referred to as the "Master DU". For each UE, a different DU may play the role of the Master DU. The Master DU can host the Medium Access Control (MAC) protocol which exchanges signaling with the UE MAC.

If an UE does not have any associated DU yet then the Master DU can be chosen in response to a random access process. The master DU selection can be based on:
  Sharing with neighboring DUs the Random Access received signal power or quality metric together with the identity of the PRACH resource and the received random access preamble ID. The DU, which for the given preamble ID and PRACH resource ID, received the best metric considers itself as the Master DU.
  Contention resolution at the UE. The UE answers to the random access response with the best received power or quality metric.

In the case of the centralized scheduler, the Master DU can be selected by the centralized scheduler, otherwise a distributed scheduler or other network element can perform this function. Furthermore, the assignment of a DU as the Master DU can be changed. The change of the Master DU can be triggered, for example, by the centralized/distributed scheduler of Master DU.

In various examples, the CUs and/or DUs can also include, or operate in conjunction with, a radio access network controller (RANC) or RIC with centralized functionality that includes a scheduler (e.g. a centralized scheduler that can also be referred to as a central or centric scheduler), which operates such as a MAC scheduler or other radio resource manager that operates to support scheduling such as cooperative scheduling, coexistence, power and RB allocation, RRH association and/or other resource management of the radio network 45.

Furthermore, the radio network 45 can be a cell-less radio access network (RAN) architecture and the RANC/RIC can focus on resource allocation i.e., scheduling processes and techniques in order to manage the interference, signal to noise ratio (SNR), signal to noise and interference ratio (SNIR) and improve the overall system performance. In order to implement an indoor scenario with a smart RANC/RIC, the scheduler can operate by considering the whole system interference in a policy aware handshaking among the remote radio heads (RRHs). The radio resources in this cell-less approach can be treated as a common unique pool containing the entire available resources of all RRHs and Time-Frequency Resource Blocks (RBs) which can improve the user-resource assignment freedom and subsequently increase system performance.

In the alternative, a distributed scheduler performs the functions of the central scheduler above and herein. In this configuration, resource allocation decisions are made in the Master DU of the UE. For each UE, a different DU may play the role of the Master DU which receives delivery of the CSI from the UEs. Because for each UE, another DU may play the role of the Master DU therefore there is a need for the negotiation between the DUs. Whatever scheduler is used (Centric or Distributed), after the scheduler allocates resources (in case of a Centric scheduler the resources were allocated by the Centric Scheduler and in case of Distributed Scheduler the resources were allocate by the Master DU), the data must be sent to the UE.

In various examples, the RUs, DUs and the scheduler cooperate and share signaling to support operations that, for example, can include:

Network signaling to support CSI acquisition by a central scheduler;

Network signaling to support resource allocation by a central scheduler;

Network signaling to support either direct or indirect CSI acquisition by the Master DU in a distributed scheduler configuration;

Network signaling to support resource negotiation by the Master DU with non-master DUs in a distributed scheduler configuration;

User data processing to support downlink data transmission (in accordance with scheduling via a central scheduler or distributed scheduler); and/or User data processing to support uplink data reception and combining (in accordance with scheduling via a central scheduler or distributed scheduler).

In various examples, a radio access network comprises: a master distributed unit (DU) associated with a plurality of radio units (RUs); another plurality of radio units (RUs); and a central scheduler configured to coordinate contemporaneous transmission to a user equipment UE via the plurality of RUs and the another plurality of RUs and contemporaneous reception from the user equipment UE via the plurality of RUs and the another plurality of RUs.

In addition or in the alternative to any of the foregoing, the central scheduler coordinates the contemporaneous transmission to the user equipment UE via the plurality of RUs and the another plurality of RUs and the contemporaneous reception from the user equipment UE via the plurality of RUs and the another plurality of RUs based on channel state information (CSI) received via the plurality of RUs and the another plurality of RUs.

In addition or in the alternative to any of the foregoing, the central scheduler receives the CSI corresponding to the plurality of RUs via the master DU.

In addition or in the alternative to any of the foregoing, the central scheduler receives the CSI corresponding to the another plurality of RUs via at least one other DU.

In addition or in the alternative to any of the foregoing, the master DU includes a DU data buffer for buffer for buffering the CSI corresponding to the another plurality of RUs and the at least one other DU includes at least one other DU data buffer for buffering the CSI corresponding to the another plurality of RUs.

In addition or in the alternative to any of the foregoing, the central scheduler receives the CSI corresponding to the another plurality of RUs via the master DU.

In addition or in the alternative to any of the foregoing, the central scheduler generates a resource allocation for resource blocks associated with the plurality of RUs and the another plurality of RUs.

In addition or in the alternative to any of the foregoing, the central scheduler generates precoders associated with the plurality of RUs and the another plurality of RUs.

In addition or in the alternative to any of the foregoing, the central scheduler communicates first network signaling with the Master DU that includes at least a portion of the resource allocation and at least a portion of the precoders.

In addition or in the alternative to any of the foregoing, the at least a portion of the resource allocation includes the resource allocation for resource blocks associated with the plurality of RUs and the another plurality of RUs and the at least a portion of the precoders includes the precoders associated with the plurality of RUs and the another plurality of RUs.

In addition or in the alternative to any of the foregoing, the central scheduler communicates second network signaling with the at least one other DU that includes at least another portion of the resource allocation and at least another portion of the precoders, wherein the at least another portion of the resource allocation includes the resource allocation for resource blocks associated the another plurality of RUs and the at least another portion of the precoders includes the precoders associated with the another plurality of RUs.

In addition or in the alternative to any of the foregoing, the master DU communicates network signaling with the at least one other DU that includes at least another portion of the resource allocation and at least another portion of the precoders, wherein the at least another portion of the resource allocation includes the resource allocation for resource blocks associated the another plurality of RUs and the at least another portion of the precoders includes the precoders associated with the another plurality of RUs.

In addition or in the alternative to any of the foregoing, wherein the central scheduler engages in a resource negotiation with a second scheduler, and wherein the central scheduler is further configured to coordinate the contemporaneous transmission to a user equipment UE via the plurality of RUs and the another plurality of RUs and the contemporaneous reception from the user equipment UE via the plurality of RUs and the another plurality of RUs in accordance with the resource negotiation with the second scheduler.

In addition or in the alternative to any of the foregoing, the master DU is selected via the central scheduler from a plurality of DUs of the radio access network in response to a random access process.

In various examples, a radio access network comprises: a master distributed unit (DU) associated with a plurality of radio units (RUs); another plurality of radio units (RUs); and a distributed scheduler configured to coordinate, via the master DU, contemporaneous transmission to a user equipment UE via the plurality of RUs and the another plurality of RUs and contemporaneous reception from the user equipment UE via the plurality of RUs and the another plurality of RUs.

In addition or in the alternative to any of the foregoing, the distributed scheduler coordinates the contemporaneous transmission to the user equipment UE via the plurality of RUs and the another plurality of RUs and the contemporaneous reception from the user equipment UE via the plurality of RUs and the another plurality of RUs based on channel state information (CSI) received via the plurality of RUs and the another plurality of RUs.

In addition or in the alternative to any of the foregoing, the CSI is acquired via the master DU.

In addition or in the alternative to any of the foregoing, the distributed scheduler generates precoders and a resource allocation for resource blocks associated with the plurality of RUs and the another plurality of RUs.

In addition or in the alternative to any of the foregoing, the master DU negotiates with at least one other DU to generate a resource allocation for resource blocks associated with the plurality of RUs and the another plurality of RUs. Further details regarding the operation of the scheduler, DUs and Master DU to support RF contemporaneous signaling to/from a single UE via multiple RUs and DUs, including several optional functions and features, can be discussed in conjunction with the figures that follow. Any details regarding these additional discussions can be used in addition or alternative to any of the foregoing.

Figure 2:
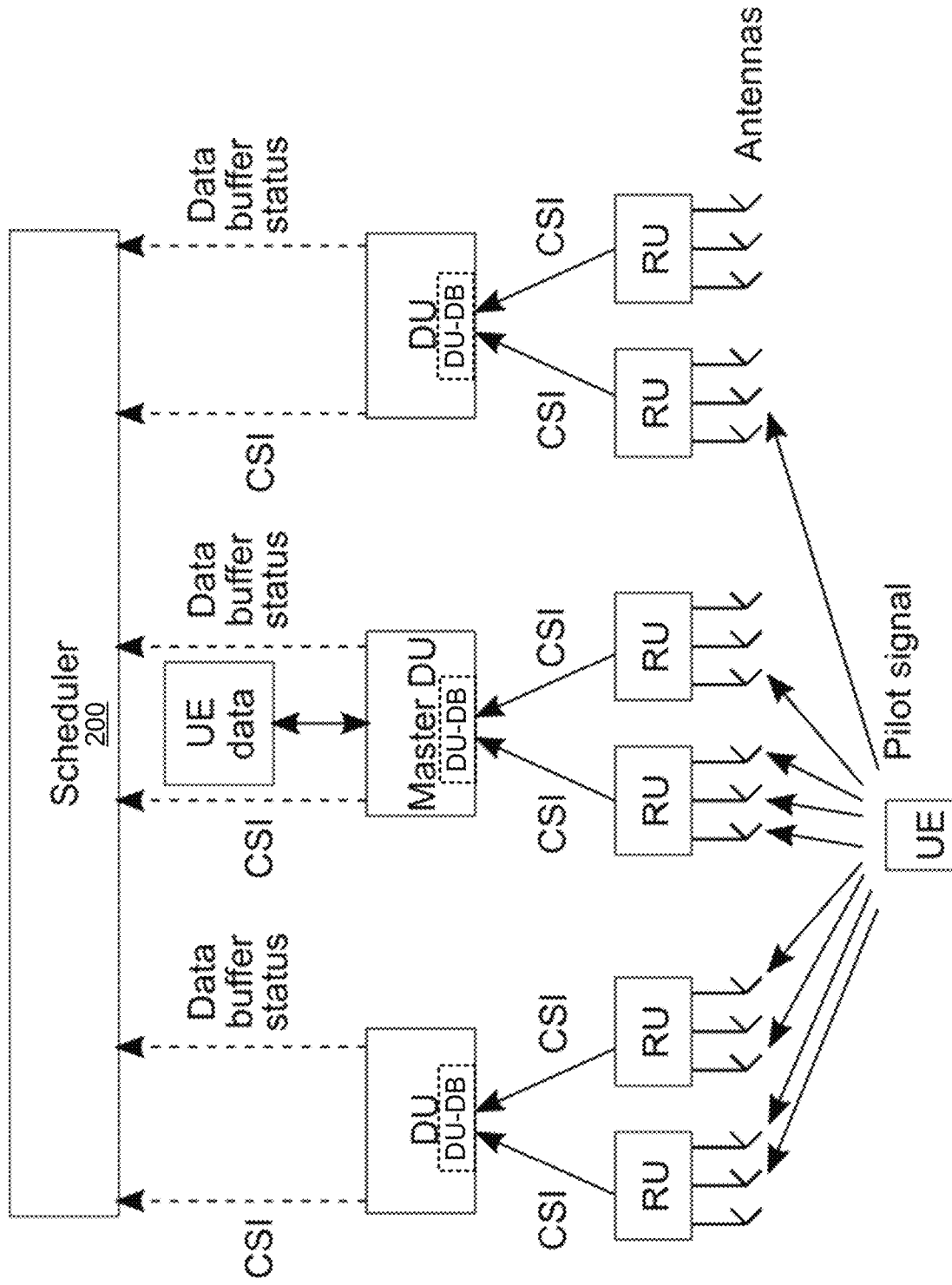
FIG. 2 is a block diagram illustrating an example portion of a radio network.

FIG. 2 is a block diagram illustrating an example portion of a radio network. In particular, an example is shown of network signaling between RUs, DUs and a scheduler 200

(e.g., a central scheduler) to support CSI acquisition by a scheduler in a CU or other network element 34-1. In this example, the scheduler collects the CSI and status of the UE data buffers from a group of DUs including a master DU. The DUs can each include a DU data buffer (DU-DB) for buffering the collected CSI. The status of these DU data buffers can be shared with the scheduler, in addition to the CSI.

Figure 3:
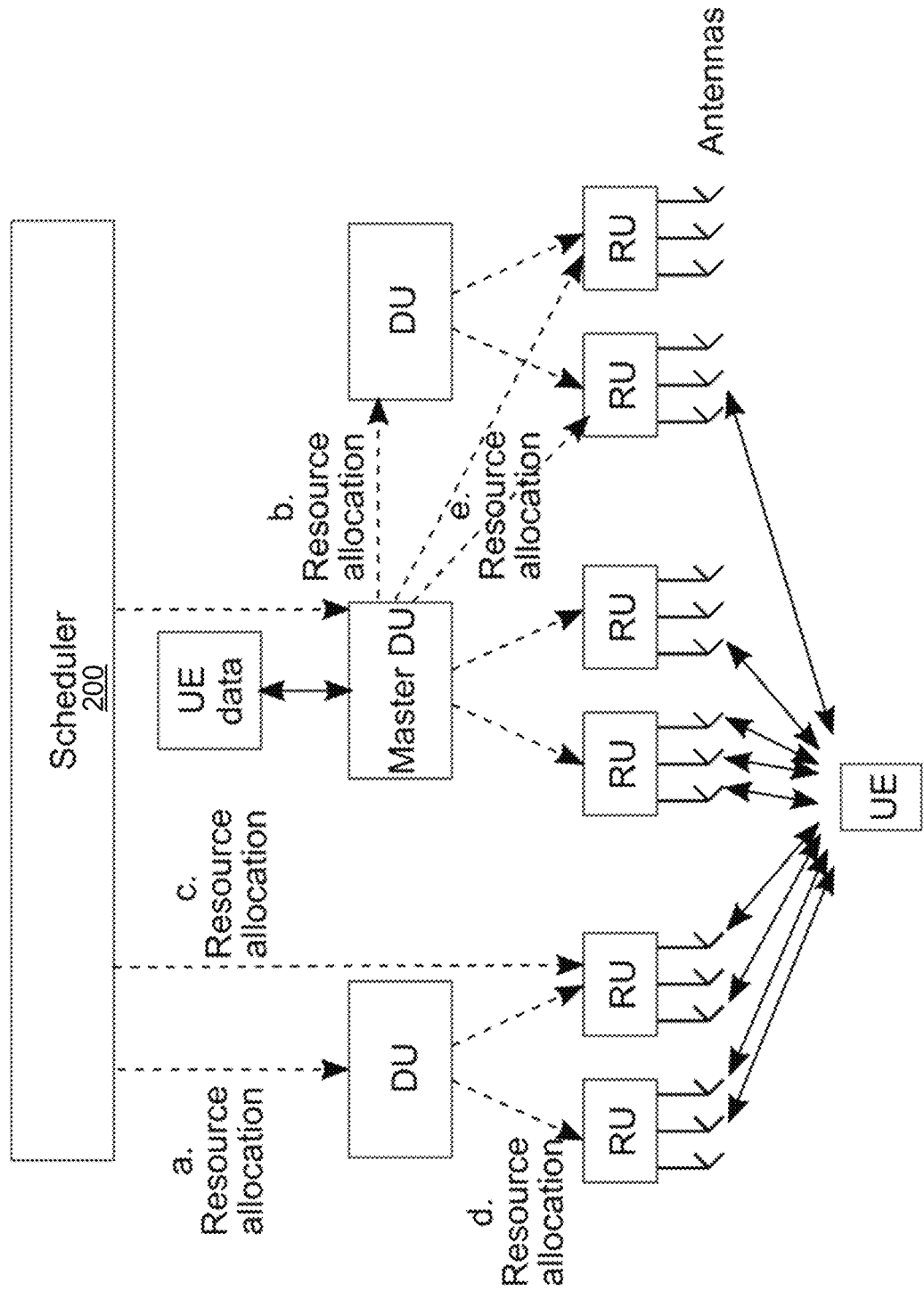
FIG. 3 is a block diagram illustrating an example portion of a radio network.

FIG. 3 is a block diagram illustrating an example portion of a radio network. In particular, an example is shown of network signaling between RUs, DUs and a scheduler to support resource allocation by the scheduler. In this example, the scheduler 200 (e.g., a central scheduler) allocates physical resource block resources to be transmitted to the UE or received from the UE by the RUs. The network signaling (which can be called allocation signaling or more simply resource allocation), can include precoders and other allocation data, and can be delivered over one or more paths, for example:
  a. From the scheduler to the DU controlling the RUs.
  b. From the scheduler through the Master DU to the DU controlling the RUs.
  c. From the scheduler directly to an RU.
  d. From a DU to an RU.
  e. From the Master DU to an RU owned by another DU.

Figure 4:
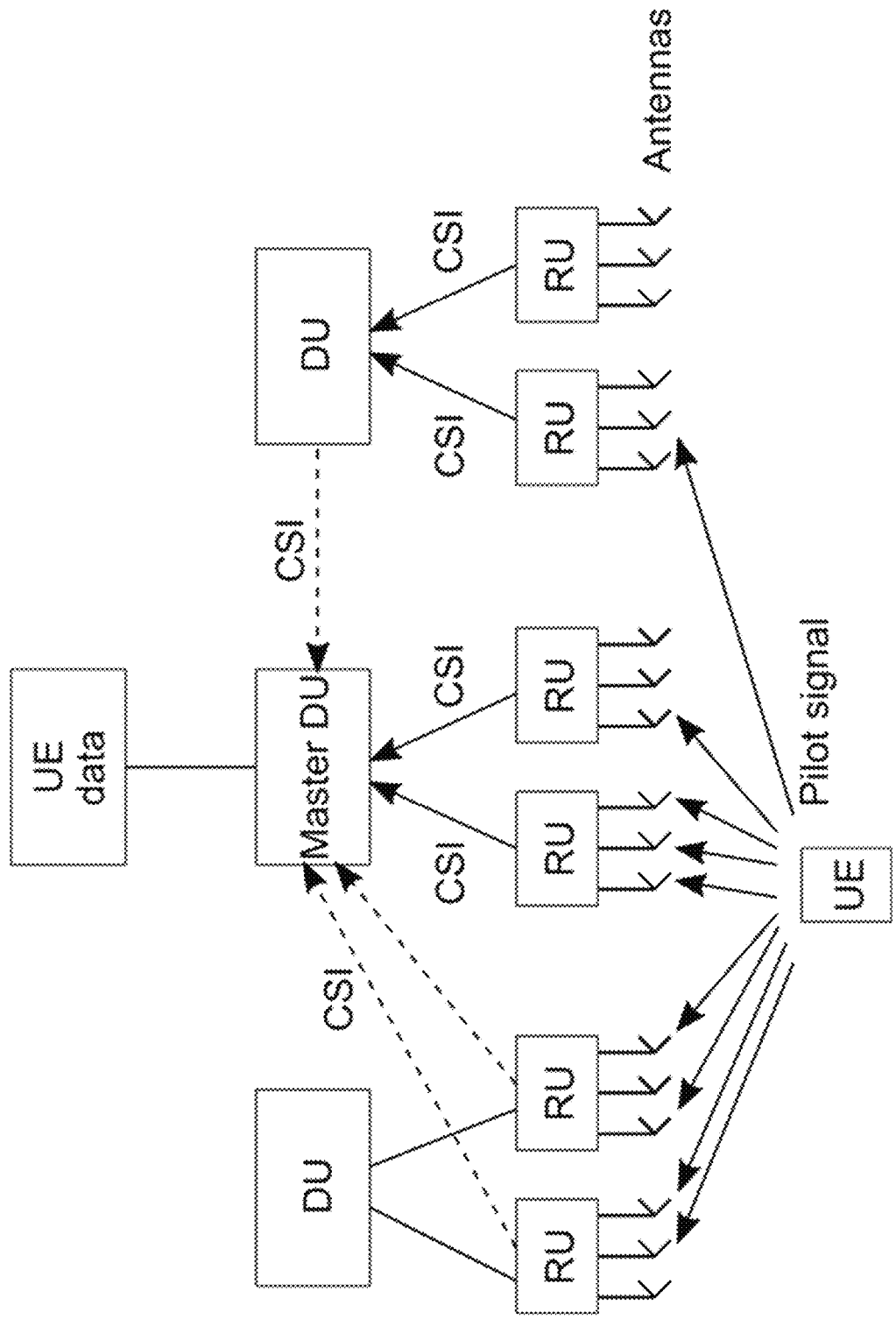
FIG. 4 is a block diagram illustrating an example portion of a radio network.

FIG. 4 is a block diagram illustrating an example portion of a radio network. In particular, an example is shown of network signaling between RUs, and DUs to support either direct or indirect CSI acquisition by the Master DU in a distributed scheduler configuration. In this example, the Master DU collects the CSI measurements from RUs of its own as well as of other DUs. In particular, the CSI can be received directly from RUs or indirectly through another DU. Based on the received CSI, the Master DU can determine, for example:
  The antennas to be used transmit to the UE or receive signals from the UE; and/or
  The precoders to be used when transmitting from the antennas.

Figure 5:
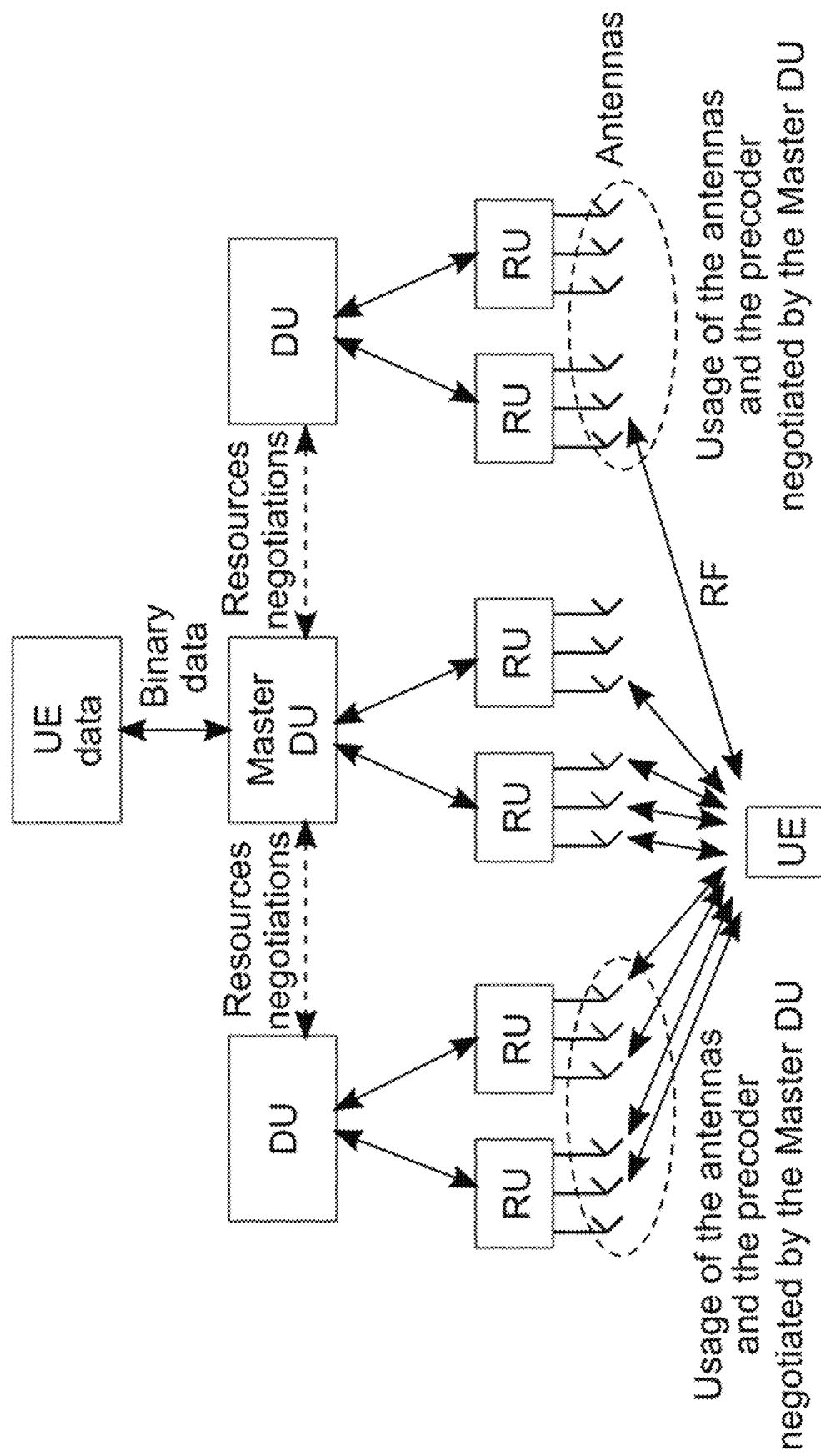
FIG. 5 is a block diagram illustrating an example portion of a radio network.

FIG. 5 is a block diagram illustrating an example portion of a radio network. In particular, an example is shown of network signaling between RUs, and DUs to support resource negotiation by Master DU with non-master DUs in a distributed scheduler configuration. In this example, the Master DU negotiates with other DUs:
  The intention to transmit signal by antennas of RUs connected to other DUs;
  The intention to receive signal by antennas of RUs connected to other DUs and/or
  The precoder the Master DU wants to use for the transmission by antennas of RUs connected to other DU.

Figure 6:
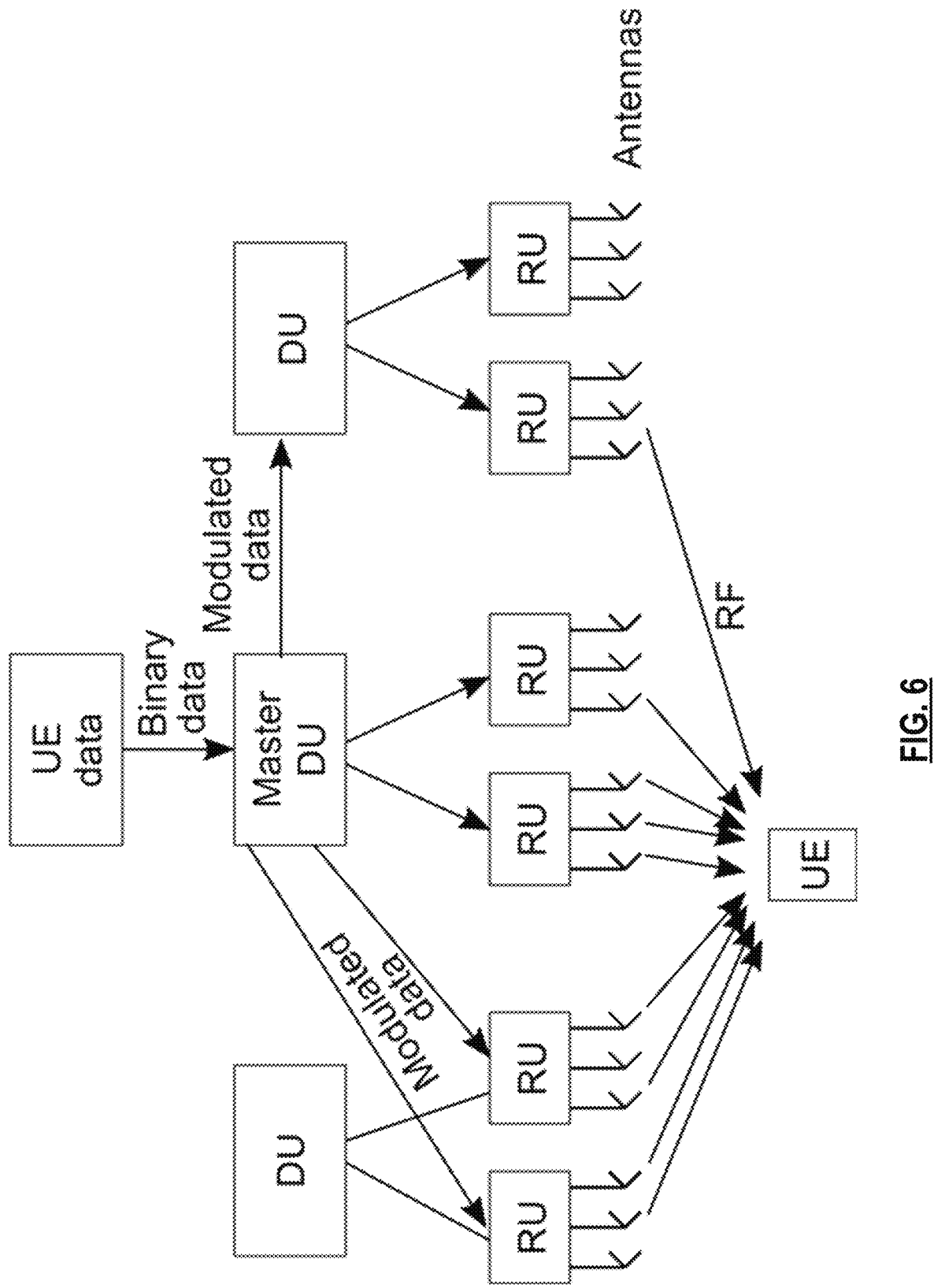
FIG. 6 is a block diagram illustrating an example portion of a radio network.

FIG. 6 is a block diagram illustrating an example portion of a radio network. In particular, an example is shown of user data processing between RUs, and DUs to support to support downlink data transmission to the UE through multiple antennas connected to multiple RUs—regardless of whether a distributed or central scheduler is used.

In this example, data transmission of RF signals to the UE is accomplished through multiple antennas connected to multiple RUs which are connected to multiple DUs. The UE binary data can be modulated into complex-valued modulation symbols in the Master DU. From the Master DU the complex-valued modulation symbols—which can be referred to as complex-valued symbols, modulated data (that indicates these complex-valued symbols) and/or more simply, can be referred to as complex-valued data—are sent to the RUs involved in the transmission to the UE. Two solutions exist if the RU is connected to non-master DU:
  The modulated data is sent from the Master DU to the non-master DU, from where it is sent to the RU.
  A single RU is connected to multiple DUs. In this case, modulated data is sent directly from the master DU to a not-owned RU.

Figure 7:
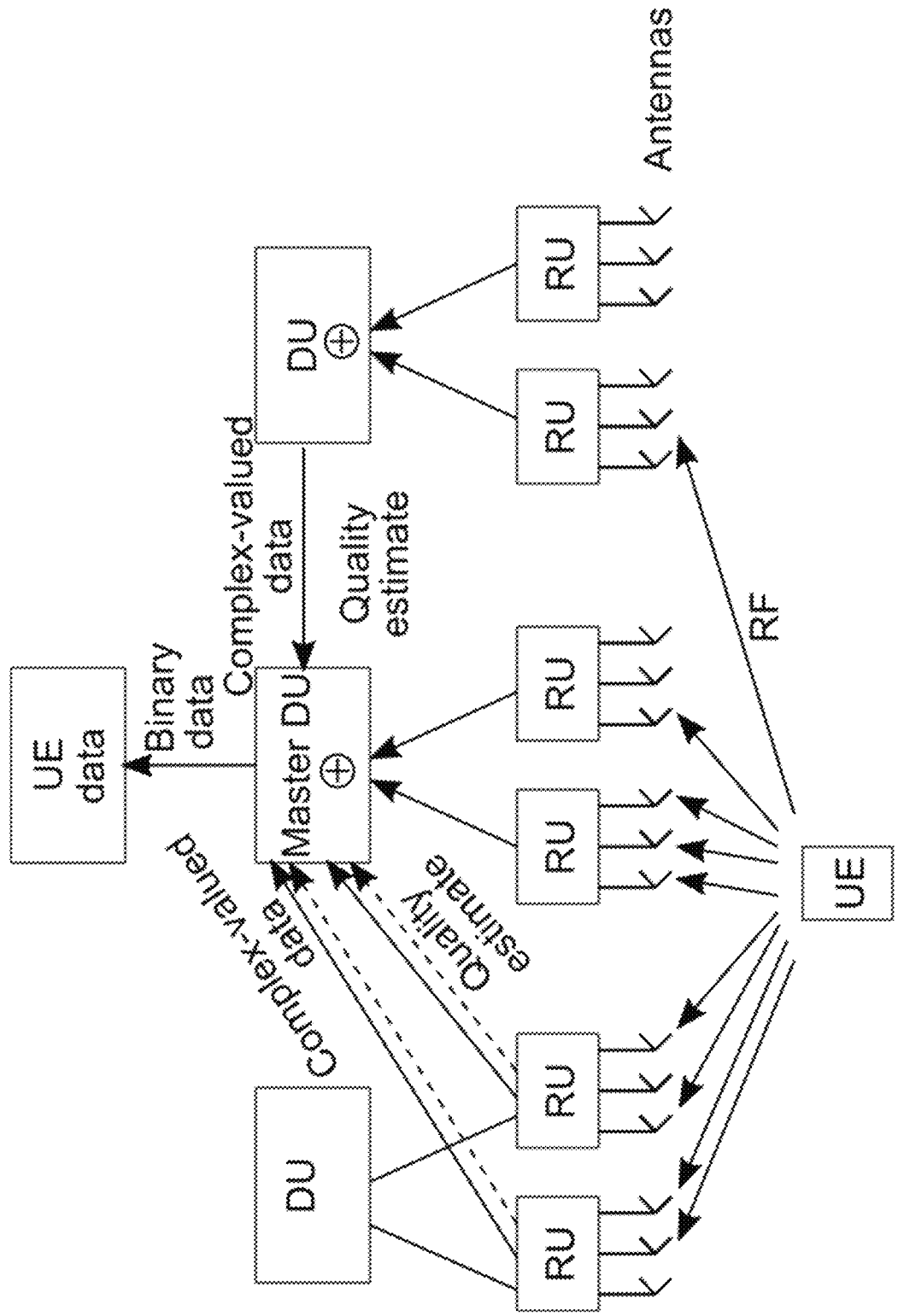
FIG. 7 is a block diagram illustrating an example portion of a radio network.

FIG. 7 is a block diagram illustrating an example portion of a radio network. In particular, an example is shown of user data processing to support uplink data reception and combining—regardless of whether a distributed or central scheduler is used. UE transmission reception is through multiple antennas connected to multiple RUs—connected to multiple DUs. the data received by multiple antennas of the RU are combined in the RU and sent to the DU as complex-valued data and/or quality estimates. The DU further combines the data (including complex-valued signals) received from its RUs. In this example the Master DU combines data (including complex-valued signals) received from multiple DUs with data received from its own RUs as well as from directly from RUs controlled by other DUs.

The operation of the RUs, DUs and scheduler, whether centralized or distributed, is further discussed in conjunction with the further examples that follow including the descriptions of FIGS. 8, 9A-9D, 10-12, 13A-13D, 14A, 14B and 15. In particular, any of the additional functions of features described therein can be used in addition or alternative to any of the foregoing.

FURTHER EXAMPLES

In a typical solution, a UE is connected to one AP (eNB or/and gNB) and served by its fixed antennas. The precoder, necessary to coordinate the transmission from the antennas, is executed at the eNB/gNB based on the acquired Channel State Information (CSI). In various examples, UEs can be served by a number of APs, which can be dynamically changed. Additionally, the precoders necessary for the simultaneous transmission from many APs will be coordinated on the AP cluster level to improve the UEs SINR and thus network capacity and UE throughput.

This cell-free massive MIMO (mMIMO) further improves the technology of wireless radio networks via:
  Simultaneous transmission in the same time slot and frequency resource from many APs to many UEs by separating the UEs in the space domain thanks to constructive or destructive interference of multipath propagating signals controlled by the precoders.
  Dynamic selection of the APs transmitting to a particular UE.
  Dynamic AP precoder determination for transmission to UEs from many APs.

Consider the following example where there is one cell-free mMIMO scheduler per group of DUs. This group of the DUs can be referred to as the cell-free mMIMO region. The scheduler may reside in RIC in the form of xApp and communicate with DUs through the E2 interface, but the scheduler may also be located independently of the RIC and communicate with the DU with use of another interface such as a G1-C interface. The scheduler collects CSIs (such as measurements in response to sounding reference signals as discussed herein or other CSI) from all UEs served by the DUs of the cell-free mMIMO region and selects:
  the APs serving each UE, and
  the precoder to be used by the APs.

The precoder is a complex number. The absolute part of the precoder determines the power used by the AP and the argument of the precoder determines the phase shift of the transmitted signal towards the UE.

One DU, which hosts the RLC entities, is referred to as the serving DU. The scheduler uses the G1-C interface to the serving DU to:

Receive the buffer size per RLC entity with the amount of data waiting for the downlink transmission towards the UE; and Indicate the APs that should be used for transmission towards the UE and the precoder each AP should use.

The High PHY of the serving DU:

In downlink, codes the Transport Block; and

In uplink, combines the transmissions received by multiple APs and decodes the Transport Block.

Figure 8:
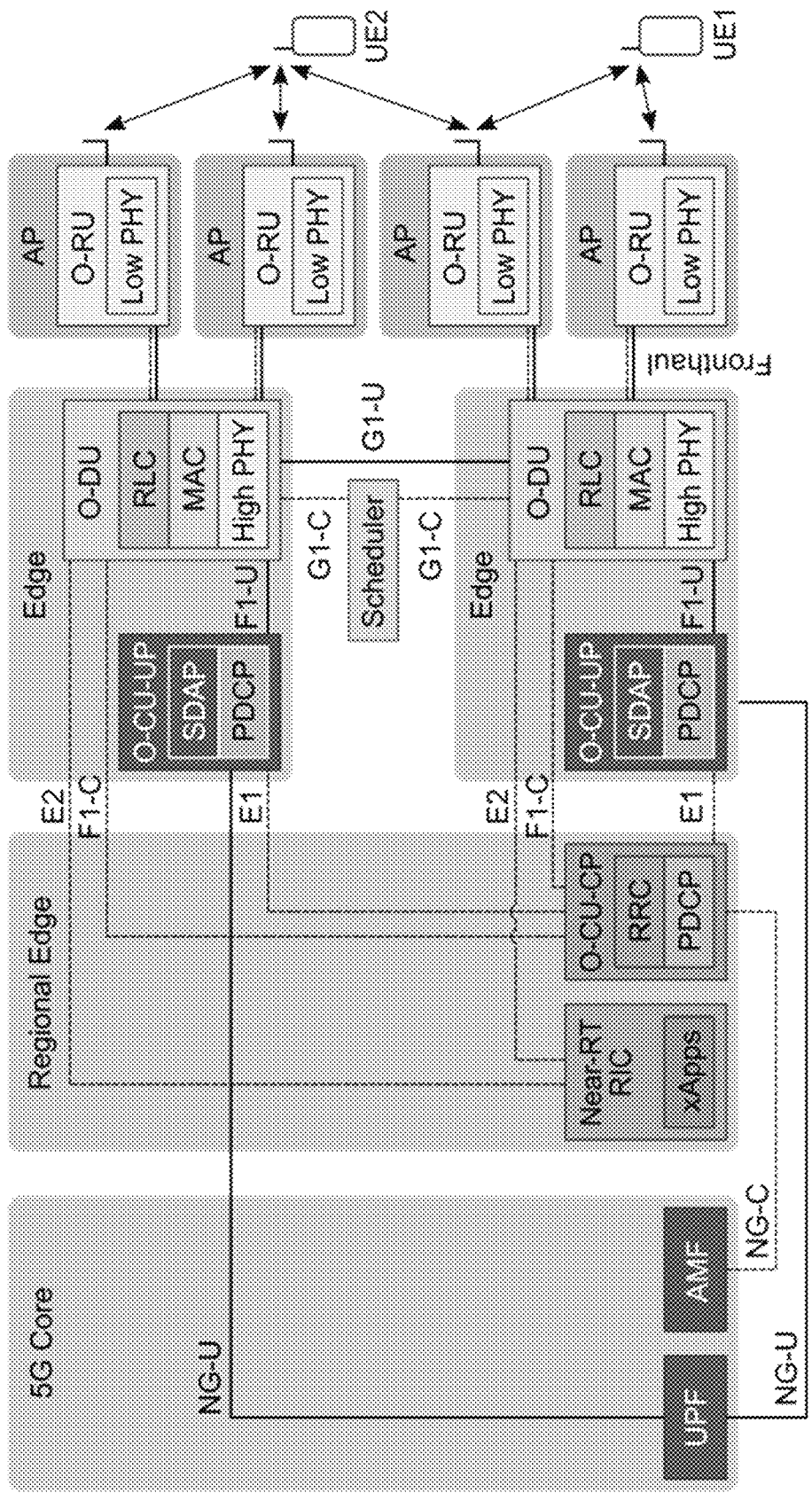
FIG. 8 is a block diagram illustrating an example portion of a radio network.

FIG. 8 is a block diagram illustrating an example portion of a radio network. In particular, a cell-free mMIMO configuration is shown that uses industry-defined acronyms that will be understood by one of ordinary skilled in the art. Consider that the following two factors can be adjusted in order to simultaneously deliver signals from multiple access points to the UE:

1. Access point (AP) synchronization; and
2. Data passing infrastructure.

Without these factors we may support coordinated multi-point functionality, e.g. transmission to the UE from one AP at a time (which allow for interference avoiding) and unnoticeable handover (change of serving antenna without notice from UE side). While those two factors do increase spectral efficiency and may be considered as part of a cell-free configuration, still they may not address interference management to the extent allowing for constructive interference of wanted and destructive interference of unwanted signals. These issues can be addressed separately by the scheduler.

The configuration of FIG. 8 is an example of data passing infrastructure that aims to pass data between High PHY, and Low PHY elements of the network. In downlink, this configuration provides a way to deliver transport blocks from High PHY to multiple Low PHYs. In uplink this configuration provides a way to deliver received signals from Low PHY to High PHY, where signals from multiple antennas, related to single UE, may be merged as previously discussed.

FIGS. 9A-9D are schematic diagrams illustrating example configurations of high and low PHY elements in a radio network. For example, in O-RAN split (7.2), Low PHY can be part of an RU, and High PHY can be part of DU. Other solutions are possible including High PHYs and Low PHYs on the same hardware (e.g., split 6 or split 8).

Figure 9C:
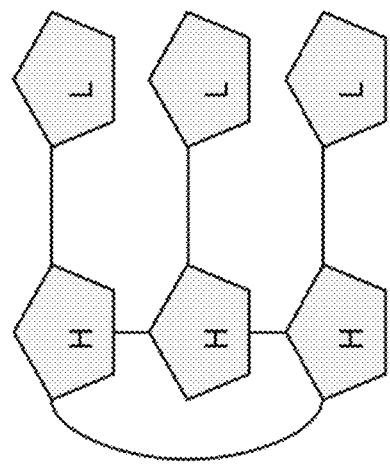
FIGS. 9A-9D are schematic diagrams illustrating example configurations of high and low PHY elements in a radio network.
Figure 9B:
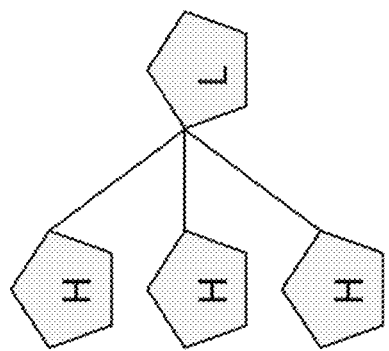
Figure 9D:
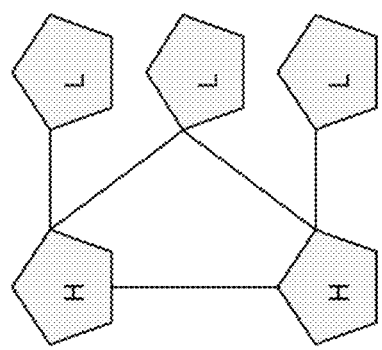
Figure 9A:
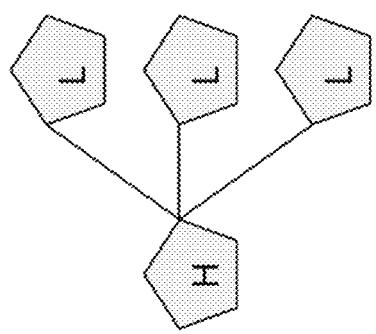

In FIG. 9A, a single High PHY manages all low Phys. In FIG. 9B, each Low PHY interfaces with multiple High PHYs. FIG. 9C provides an interface between High PHYs. This can be the same as interface between Low PHY and multiple High PHYs—with just a different in physical implementation differs. In FIG. 9D, a mix of the other configurations is shown. With these techniques, data can be passed directly (FIGS. 9A & 9B) or indirectly (FIG. 9C) through a neighboring High PHY or in the mix way (FIG. 9D). The connection pattern may or may not be fixed. Such connections allow:

Passing indications (transport blocks and precoding) from single High PHY to multiple Low PHYs (allowing for simultaneous transmission from multiple APs to single UE); and Received signals from Low PHY to multiple High PHYs. Allowing for merging signals received by multiple APs, transmitted by single UE. For this purpose solution 1 is better as it allows easier to filter out signals from other UEs. The "signals" here being both—SRS references and data transmissions from the UE.

AP Synchronization

The aim of the AP synchronization is to synchronize the carrier frequency transmitted by APs. As a result of the AP synchronization the signals received by the stationary UE from multiple APs will have constant phase shift and thus the phase shift can be changed by the precoder.

Its aim is to synchronize signals sent from access points, so that carrier waves of each AP have constant phase shift between consecutive UE signal measurements f/10. Depending on frequency band, "constant phase shift" allows 10 to 100 ps discrepancies, and measurements may be repeated every 10 to 100 ms as described as follows. Hence, short-term stability of about 1 ps/ms, that is 1 ppb is desired. Those discrepancies include:

Reference errors (transport and read of reference).

Reference errors are mostly related to reference passing infrastructure.

In various embodiments, the signals sent from access points can be synchronized by:

Synchronizing all APs to reference signals sent by one of the APs (regarded as reference AP).

Using a secondary link dedicated to the reference clock (e.g. 10 MHz). It may go through copper or through air. As long as it is:

dedicated to the reference clock, the same for the entire system, and equipped with noise prevention features.

Medium errors (moving of sources of reflections in case of multipath propagation) and UE position changes can be tracked, predicted and compensated in order to decrease their influence.

In various examples, the cell-free massive MIMO scheduling includes the following operations:

Measurement and input collection.

Cell-free scheduling procedure.

Fronthaul interface.

HARQ operation.

Figure 10:
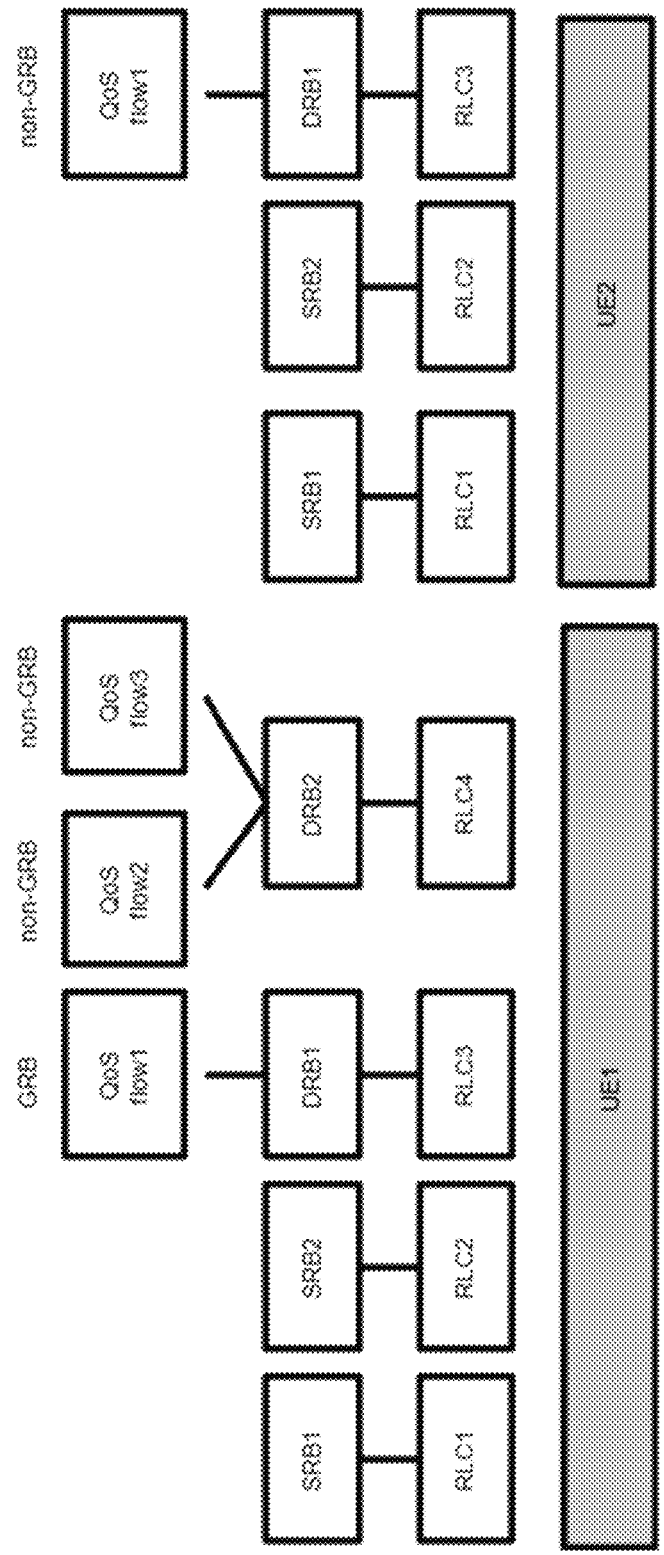
FIG. 10 is a block/flow diagram illustrating an example of measurement and inputs in a portion of a radio network.

FIG. 10 is a block/flow diagram illustrating an example of measurement and inputs in a portion of a radio network. The network may transmit to the UE from a number of APs, which can be referred to as the mMIMO cluster. The mMIMO cluster is determined for each transmission. The mMIMO cluster depends on, for example, the power received from the UE by APs and the traffic demand.

The UEs, for example, are configured with Sounding Reference Signals (SRSs). The SRS allocated to the UEs are orthogonal. The SRS orthogonality can be obtained in the time domain, the frequency domain, the code domain, via the beam, polarization or the space domain. The APs of the mMIMO cluster can measure the received power and the phase shift of the SRS per PRB. These measurements are referred to as the Channel State Information (CSI) and are delivered to the MAC scheduler and the Near-Real Time RAN Intelligent Controller (Near-RT RIC).

Search Cluster

The Medium Access Control (MAC) scheduler and the Near-RT RIC is also informed about the Signaling Radio Bearers (SRBs) and Data Radio Bearers (DRBs) configured for each UE. The following configuration information is provided to the MAC scheduler:

The priority of the SRB and DRB.

For DRB the resource type: Guaranteed Bit Rate (GBR) or Non-Guaranteed Bit Rate (Non-GBR).

For GBR DRBs the guaranteed bit rate in kbps, which should be achieved by the RLC entity associated with the DRB.

For each RLC entity associated with a SRB or DRB the amount of bits in the RLC buffer.

Further operations including a cell-free scheduling algorithm and random access procedure are described below.

Cell-Free Scheduling Algorithm

One DU, which hosts the RLC entities, is referred to as the serving DU. The serving DU is initially selected in the random access procedure and later may be changed by the Near-RT RIC, for example as a result of received uplink power change at the APs or traffic demand.

The Near-RT RIC determines the APs composing the mMIMO cluster and communicates its decision to the serving DU. The serving DU hosts the MAC scheduler and High PHY signal processing common for all the APs (i.e. coding and modulation). The serving DU sends the codewords (CWs) to the APs of the mMIMO cluster together with the precoder(s) to be used by the APs. When precoding the UE codewords, the AP may be instructed by the DU to use different precoders per Resource Block Group (RBG).

Random Access Procedure for Cell-Free mMIMO

The random access procedure (which can also be referred to as a random access process) can be divided into the following steps:

An UE sends the random access preamble with a specific random access preamble ID.

The random access preamble ID can be detected by several RUs. Each RU sends the received random access preamble ID, together with its received signal strength level, to its DU.

Each DU sends to neighboring DUs the received random access preamble ID including the strongest RU received signal.

The DUs use the following priority order to determine which of them is the serving DU and which are complimentary DUs.

The DU which received the strongest signal power considers itself as the serving DU.

In case more than one DU received the same strongest received power then the DU with the highest DU priority considered itself as the serving DU.

All DUs make the comparison simultaneously, so there is no negotiation concerning priority, it is fixed beforehand. Decisions on priority levels may be taken either by CU-CP or RIC or other component with enough data to take the decision, and forward it to DUs.

The serving DU sends the Random Access Response using the AP that reported the preamble ID with the strongest received power.

UE sends its identity (msg 3).

The DU forwards msg 3 to CU-CP. There access control decision is taken and communicated to the UE with (msg 4).

At this point UE sends (msg 5) and the attachment procedure proceeds with control plane messaging. The procedure is the same as legacy, including NAS messaging, initial bearers setup and ciphering algorithms. The significant part, from our perspective, is measurement configuration as desirable for the cell-free algorithms.

As may be noticed, in that setup, the attach area is smaller than the service area.

Figure 11:
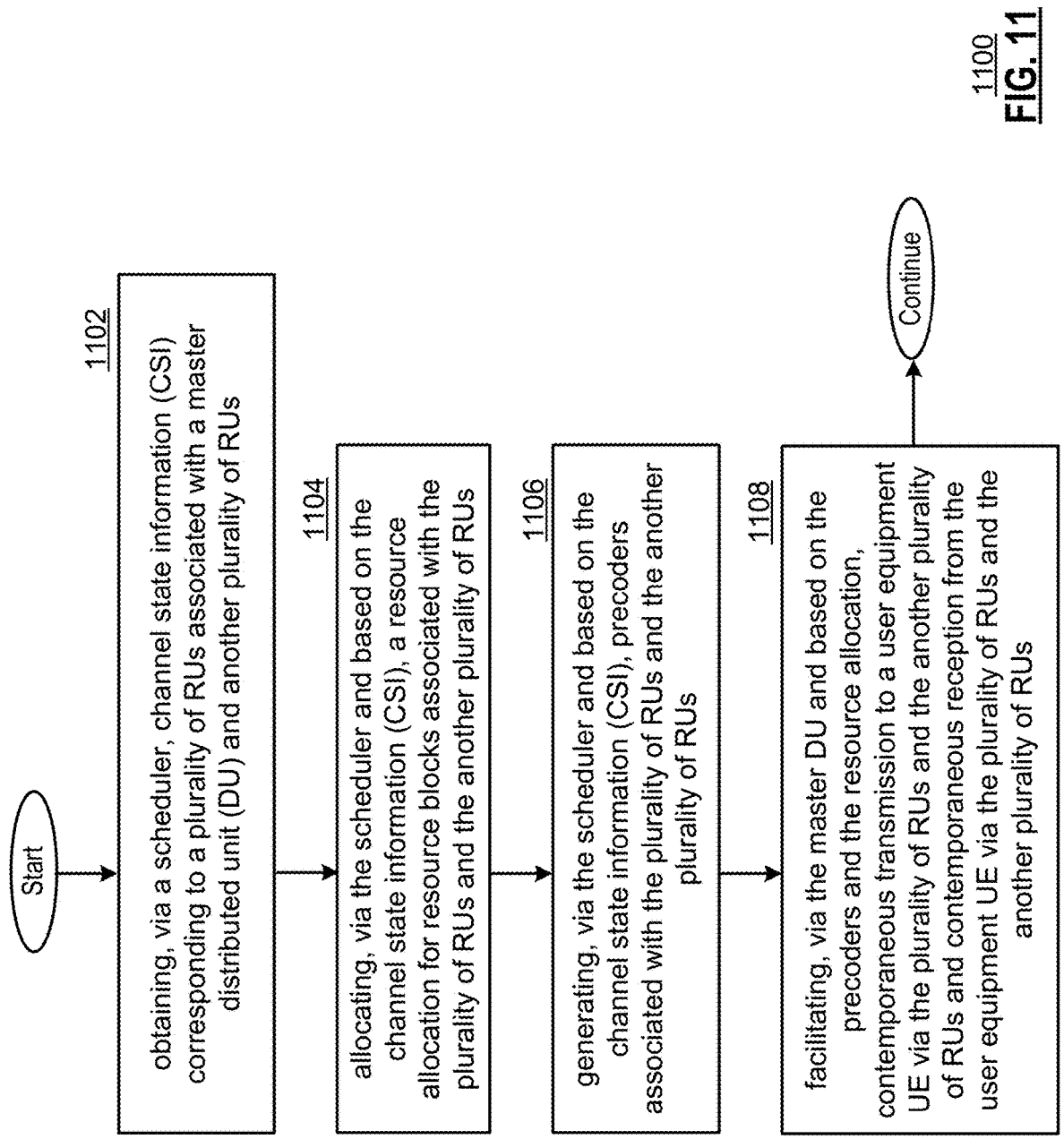
FIG. 11 is a flow diagram illustrating an example method.

FIG. 11 is a flow diagram illustrating an example method. In particular, a method 1100 is presented for use with one or more functions and features described in conjunction with FIGS. 1-8, 9A-9D, 10-12, 13A-13D, 14A, 14B and 15. Step 1102 includes obtaining, via a scheduler, channel state information (CSI) corresponding to a plurality of RUs associated with a master distributed unit (DU) and another plurality of RUs. Step 1104 includes allocating, via the scheduler and based on the channel state information (CSI), a resource allocation for resource blocks associated with the plurality of RUs and the another plurality of RUs.

Step 1106 includes generating, via the scheduler and based on the channel state information (CSI), precoders associated with the plurality of RUs and the another plurality of RUs. Step 1108 includes facilitating, via the master DU and based on the precoders and the resource allocation, contemporaneous transmission to a user equipment UE via the plurality of RUs and the another plurality of RUs and contemporaneous reception from the user equipment UE via the plurality of RUs and the another plurality of RUs.

In addition or in the alternative to any of the foregoing, the scheduler coordinates the contemporaneous transmission to the user equipment UE via the plurality of RUs and the another plurality of RUs and the contemporaneous reception from the user equipment UE via the plurality of RUs and the another plurality of RUs based on channel state information (CSI) received via the plurality of RUs and the another plurality of RUs.

In addition or in the alternative to any of the foregoing, the scheduler receives the CSI corresponding to the plurality of RUs via the master DU.

In addition or in the alternative to any of the foregoing, the scheduler receives the CSI corresponding to the another plurality of RUs via at least one other DU.

In addition or in the alternative to any of the foregoing, the master DU includes a DU data buffer for buffer for buffering the CSI corresponding to the another plurality of RUs and the at least one other DU includes at least one other DU data buffer for buffering the CSI corresponding to the another plurality of RUs.

In addition or in the alternative to any of the foregoing, the scheduler receives the CSI corresponding to the another plurality of RUs via the master DU.

In addition or in the alternative to any of the foregoing, the scheduler generates a resource allocation for resource blocks associated with the plurality of RUs and the another plurality of RUs.

In addition or in the alternative to any of the foregoing, the scheduler generates precoders associated with the plurality of RUs and the another plurality of RUs.

In addition or in the alternative to any of the foregoing, the scheduler communicates first network signaling with the Master DU that includes at least a portion of the resource allocation and at least a portion of the precoders.

In addition or in the alternative to any of the foregoing, the at least a portion of the resource allocation includes the resource allocation for resource blocks associated with the plurality of RUs and the another plurality of RUs and the at least a portion of the precoders includes the precoders associated with the plurality of RUs and the another plurality of RUs.

In addition or in the alternative to any of the foregoing, the scheduler communicates second network signaling with the at least one other DU that includes at least another portion of the resource allocation and at least another portion of the precoders, wherein the at least another portion of the resource allocation includes the resource allocation for resource blocks associated the another plurality of RUs and the at least another portion of the precoders includes the precoders associated with the another plurality of RUs.

In addition or in the alternative to any of the foregoing, the master DU communicates network signaling with the at least one other DU that includes at least another portion of the resource allocation and at least another portion of the precoders, wherein the at least another portion of the resource allocation includes the resource allocation for resource blocks associated the another plurality of RUs and the at least another portion of the precoders includes the precoders associated with the another plurality of RUs.

In addition or in the alternative to any of the foregoing, the scheduler is a distributed scheduler and wherein the Master DU negotiates with the at least one other DU an intention to transmit signals by antennas of the another plurality of RUs and an intention to receive signals by the antennas of the another plurality of RUs.

In addition or in the alternative to any of the foregoing, the Master DU generates complex-valued symbols for transmission by antennas of the another plurality of RUs and sends the complex-valued symbols directly to the another plurality of RUs.

In addition or in the alternative to any of the foregoing, the Master DU generates complex-valued symbols for transmission by antennas of the another plurality of RUs and sends the complex-valued symbols to the at least one other DU for transmission to the another plurality of RUs.

In addition or in the alternative to any of the foregoing, the Master DU receives complex-valued symbols received by antennas of the another plurality of RUs.

In addition or in the alternative to any of the foregoing, Master DU receives complex-valued symbols received by antennas of the another plurality of RUs via the at least one other DU.

In addition or in the alternative to any of the foregoing, the scheduler is a central scheduler.

In addition or in the alternative to any of the foregoing, the scheduler engages in a resource negotiation with a second scheduler, and wherein the scheduler is further configured to coordinate the contemporaneous transmission to a user equipment UE via the plurality of RUs and the another plurality of RUs and the contemporaneous reception from the user equipment UE via the plurality of RUs and the another plurality of RUs in accordance with the resource negotiation with the second scheduler.

In addition or in the alternative to any of the foregoing, the master DU is selected via the scheduler from a plurality of DUs of a radio access network in response to a random access process.

Figure 12:
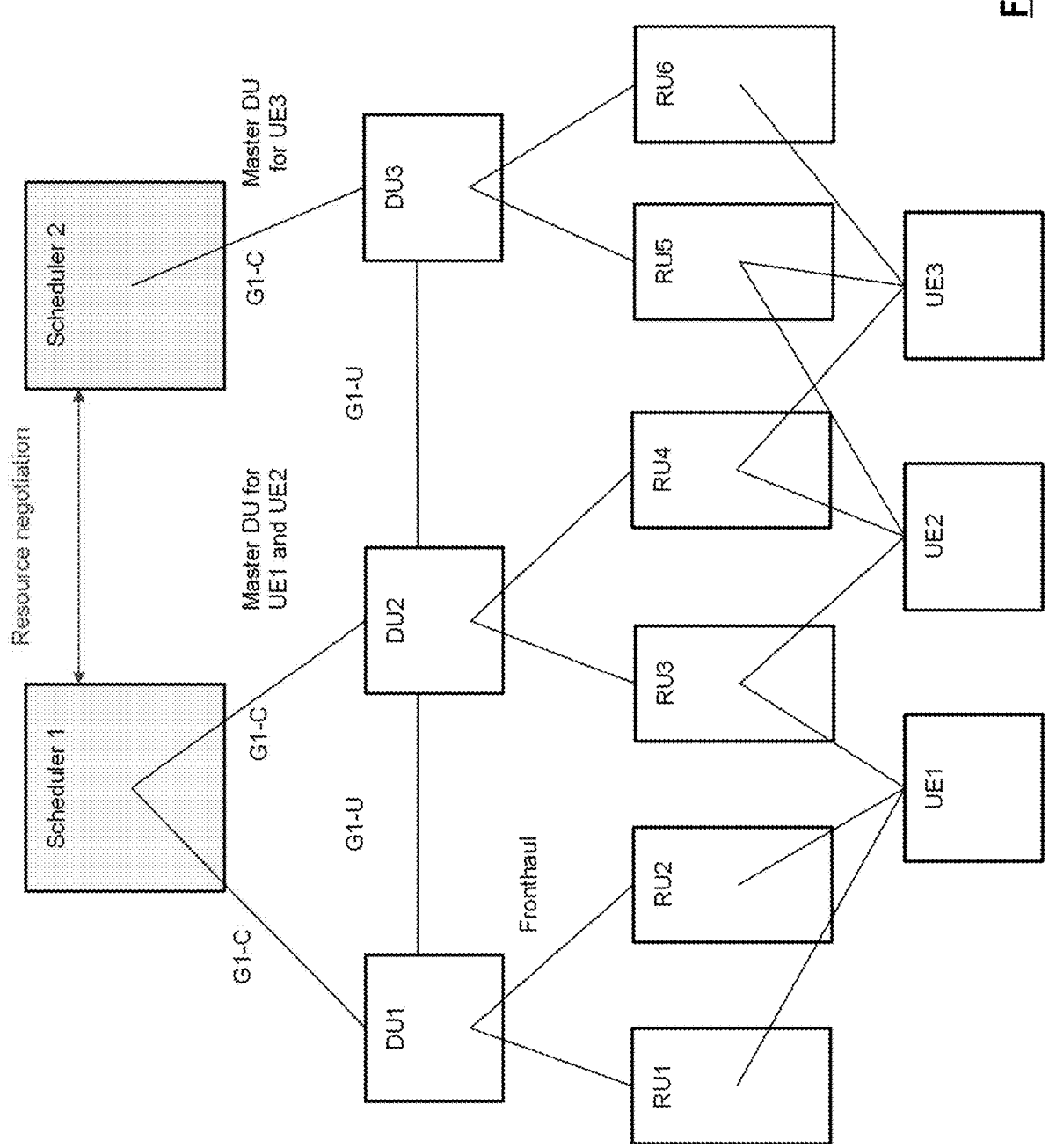
FIG. 12 is a block diagram illustrating an example portion of a radio network.

FIG. 12 is a block diagram 1200 illustrating an example portion of a radio network. While the foregoing has discussed two types of schedulers: centralized and distributed. In the case of a distributed scheduler, resource negotiations can be carried out between DUs as discussed in conjunction with FIG. 5, for example. Consider further examples discussed previously in conjunction with FIGS. 1 and 11 where a scheduler engages in resource negotiations with another scheduler (or schedulers) of the radio access network to negotiate resources under the control of these schedulers. In this fashion, while a centralized scheduler can control scheduling of many RUs connected to many DUs and is responsible for PRB resource allocation of RUs connected to the DUs controlled by the scheduler, two or more disjoint centralized schedulers can negotiate resources among themselves.

Consider the example shown in FIG. 12, where scheduler 1 is responsible for resource allocation of RUs connected to DU1 and DU2, i.e., RU1, RU2, RU3 and RU4 and scheduler 2 is responsible for resource allocation of RU5 and RU6, which are connected to DU3. In this example, if scheduler 1 (a requesting scheduler) wants to use PRB resources of RU5 and/or RU6, which are in the responsibility of scheduler 2, (referred to as the target scheduler in this case), then the scheduler 1 can engage in resource negotiations with scheduler 2 in an attempt to "borrow" and allocate these resources.

It should be noted, that in other examples, if scheduler 2 (now the requesting scheduler) wants to use PRB resources of RU1, RU2, RU3 and/or RU4, which are in the responsibility of scheduler 1, (now the target scheduler in this case), then the scheduler 2 can engage in resource negotiations with scheduler 1 in a reciprocal fashion in an attempt to "borrow" and allocate these resources.

FIGS. 13A-13D are block diagrams 1300-1, 1300-2, 1300-3 and 1300-4 illustrating example resource negotiations in a radio network. In the example shown, the requesting scheduler 1302 wants to use PRB resources of RUs, which are in the responsibility of another scheduler, referred to as the target scheduler 1304, then the requesting scheduler can negotiate the resources with the target scheduler. In various examples, the requesting scheduler 1302 can send to the target scheduler 1304 a message (e.g., resource allocation request) in which the requesting scheduler indicates:

The RUs of which PRB resources are requested.
The PRBs.
The precoder per PRB or group of PRBs.

In the response to the resource allocation request, the target scheduler 1304 can accept the request via a resource request acknowledgement as shown in FIG. 13A or reject the request via a resource request rejection as shown in FIG. 13B.

In further examples, instead or merely accepting or rejecting the request, the target scheduler 1304 can reply with a resource allocation proposal indicating, for example, the resources available for sharing along with associated resource allocation data. In this case, the requesting scheduler 1302 can either accept the resource allocation proposal as shown in FIG. 13C or reject the resource allocation proposal as shown in FIG. 13D.

Figure 14A:
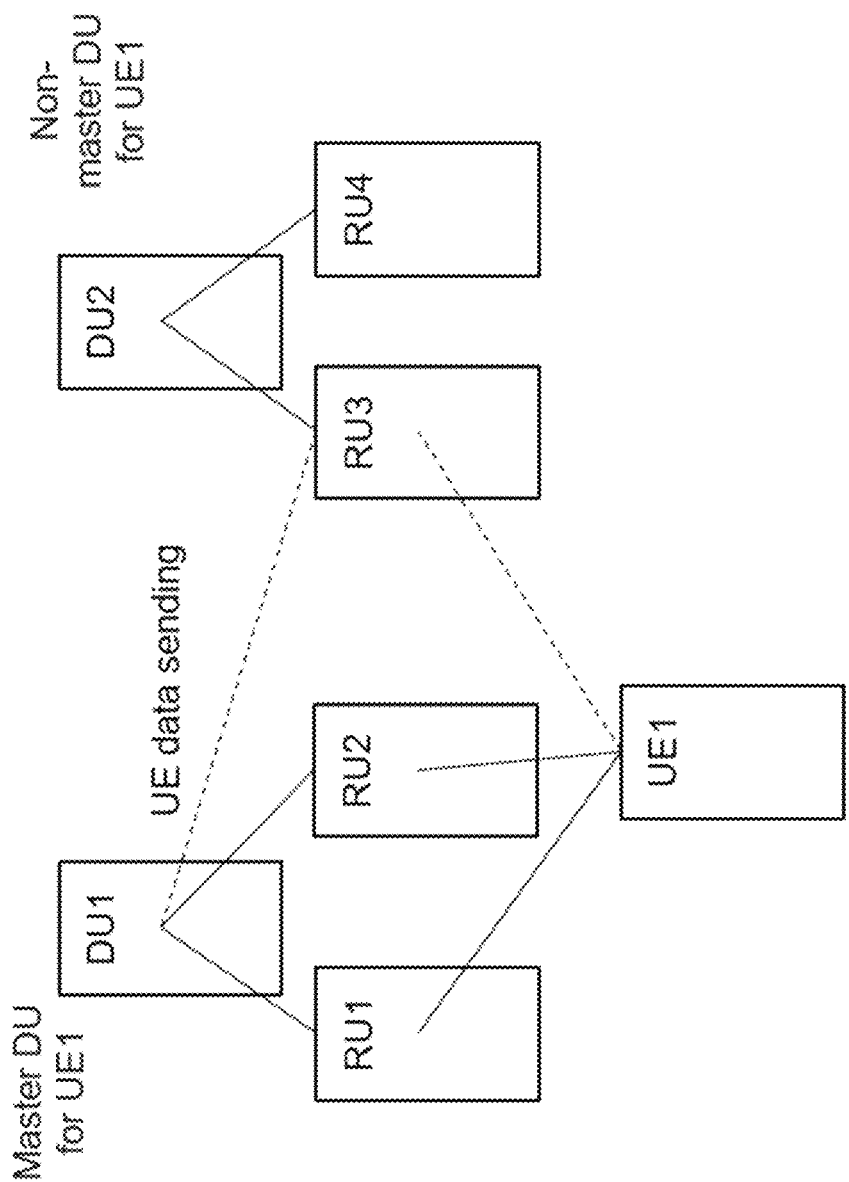
FIGS. 14A-14B are block diagrams illustrating example portions of a radio network.
Figure 14B:
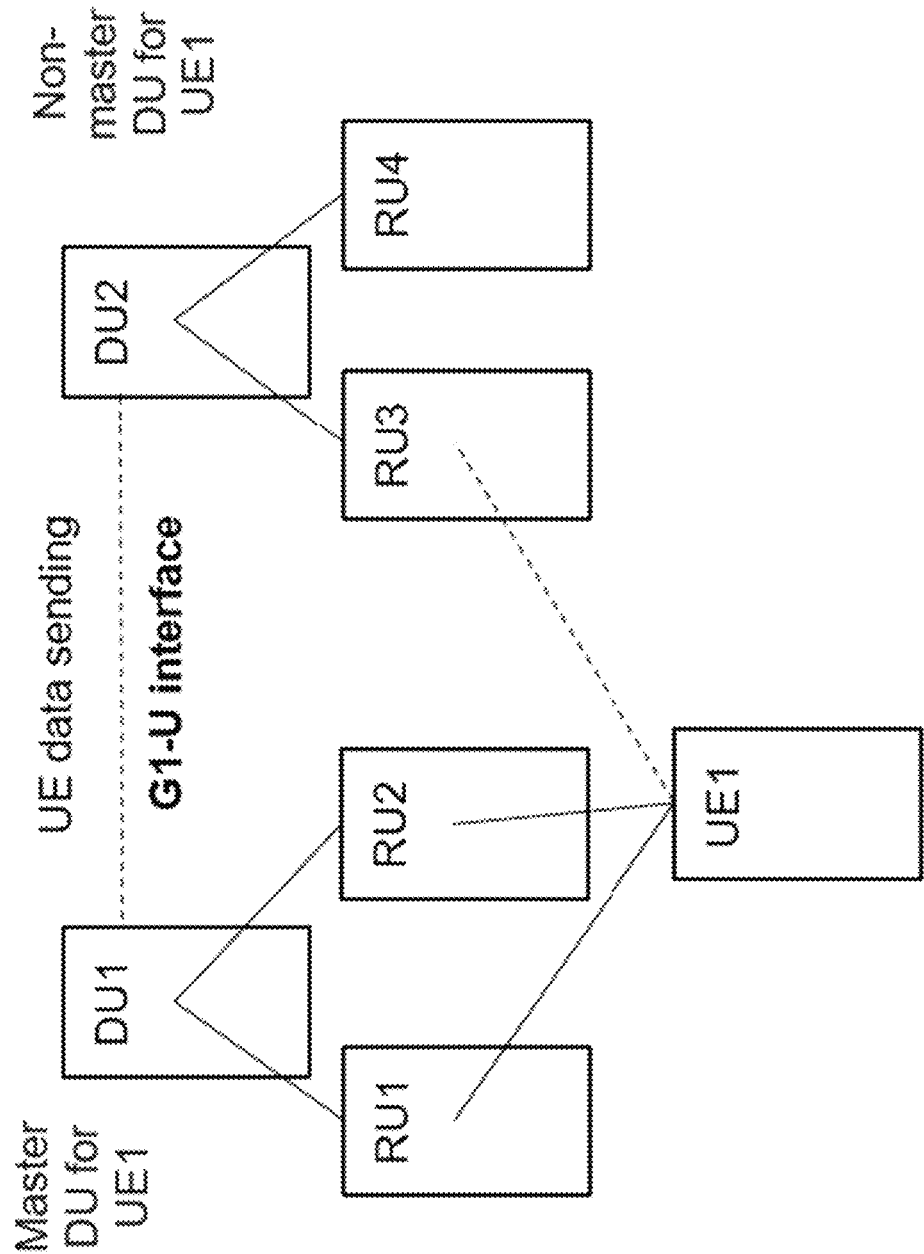

FIGS. 14A-14B are block diagrams illustrating example portions of a radio network. In particular, two examples are shown for the flow of UE data to a master DU. The UE data for UE1 can be sent to the master DU (DU1) via an RU1 and RU2 that are directly associated with the master DU and directly via RU3 as shown in FIG. 14A. In a further example, the UE data for UE 1 received by RU3 can be sent to the master DU, via DU2, a non-master DU for UE1. In particular, the G1-U interface between DU1 and DU2 can be used in this regard as shown in FIG. 14B.

FIG. 15 is a flow diagram illustrating an example method. In particular, a method 1500 is presented for use with one or more functions and features described in conjunction with FIGS. 1-8, 9A-9D, 10-12, 13A-13D, 14A, 14B and 15. Step 1502 includes obtaining, at a scheduler, channel state information (CSI) corresponding to a plurality of RUs associated with a master distributed unit (DU) and another plurality of RUs associated with at least one other DU, wherein the CSI associated with the another plurality of RUs is obtained via another scheduler or via the at least one other DU. Step 1504 includes allocating, based on the channel state information (CSI), a resource allocation for physical resource blocks (PRBs) associated with the plurality of RUs and the another plurality of RUs. Step 1506 includes negotiating with the another scheduler to obtain PRBs of RUs controlled by the another scheduler Step 1508 includes generating, based on the channel state information (CSI), precoders associated with the plurality of RUs and the another plurality of RUs. Step 1510 includes facilitating, via the master DU and based on the precoders and the resource allocation, contemporaneous transmission to a user equipment UE via the plurality of RUs and the another plurality of RUs and contemporaneous reception from the user equipment UE via the plurality of RUs and the another plurality of RUs.

In addition or in the alternative to any of the foregoing, the scheduler coordinates the contemporaneous transmission to the user equipment UE via the plurality of RUs and the another plurality of RUs and the contemporaneous reception from the user equipment UE via the plurality of RUs and the another plurality of RUs based on the CSI received via the plurality of RUs and the another plurality of RUs.

In addition or in the alternative to any of the foregoing, the scheduler receives the CSI corresponding to the plurality of RUs via the master DU.

In addition or in the alternative to any of the foregoing, the scheduler receives the CSI corresponding to the another plurality of RUs via the at least one other DU.

In addition or in the alternative to any of the foregoing, the master DU includes a DU data buffer for buffer for buffering the CSI corresponding to the another plurality of RUs and the at least one other DU includes at least one other DU data buffer for buffering the CSI corresponding to the another plurality of RUs.

In addition or in the alternative to any of the foregoing, the scheduler receives the CSI corresponding to the another plurality of RUs via the master DU.

In addition or in the alternative to any of the foregoing, the scheduler generates a resource allocation for resource blocks associated with the plurality of RUs and the another plurality of RUs.

In addition or in the alternative to any of the foregoing, the scheduler generates precoders associated with the plurality of RUs and the another plurality of RUs.

In addition or in the alternative to any of the foregoing, the scheduler communicates first network signaling with the Master DU that includes at least a portion of the resource allocation and at least a portion of the precoders.

In addition or in the alternative to any of the foregoing, the at least a portion of the resource allocation includes the resource allocation for resource blocks associated with the plurality of RUs and the another plurality of RUs and the at least a portion of the precoders includes the precoders associated with the plurality of RUs and the another plurality of RUs.

In addition or in the alternative to any of the foregoing, the scheduler communicates second network signaling with the at least one other DU that includes at least another portion of the resource allocation and at least another portion of the precoders, wherein the at least another portion of the resource allocation includes the resource allocation for resource blocks associated the another plurality of RUs and the at least another portion of the precoders includes the precoders associated with the another plurality of RUs.

In addition or in the alternative to any of the foregoing, the master DU communicates network signaling with the at least one other DU that includes at least another portion of the resource allocation and at least another portion of the precoders, wherein the at least another portion of the resource allocation includes the resource allocation for resource blocks associated the another plurality of RUs and the at least another portion of the precoders includes the precoders associated with the another plurality of RUs.

In addition or in the alternative to any of the foregoing, the scheduler is a distributed scheduler and wherein the Master DU negotiates with the at least one other DU an intention to transmit signals by antennas of the another plurality of RUs and an intention to receive signals by the antennas of the another plurality of RUs.

In addition or in the alternative to any of the foregoing, the Master DU generates complex-valued symbols for transmission by antennas of the another plurality of RUs and sends the complex-valued symbols directly to the another plurality of RUs.

In addition or in the alternative to any of the foregoing, the Master DU generates complex-valued symbols for transmission by antennas of the another plurality of RUs and sends the complex-valued symbols to the at least one other DU for transmission to the another plurality of RUs.

In addition or in the alternative to any of the foregoing, the Master DU receives complex-valued symbols received by antennas of the another plurality of RUs.

In addition or in the alternative to any of the foregoing, the Master DU receives complex-valued symbols received by antennas of the another plurality of RUs via the at least one other DU.

In addition or in the alternative to any of the foregoing, the scheduler is a central scheduler.

In addition or in the alternative to any of the foregoing, the scheduler engages in a resource negotiation with the another scheduler, and wherein the scheduler is further configured to coordinate the contemporaneous transmission to a user equipment UE via the plurality of RUs and the another plurality of RUs and the contemporaneous reception from the user equipment UE via the plurality of RUs and the another plurality of RUs in accordance with the resource negotiation with the another scheduler.

In addition or in the alternative to any of the foregoing, the master DU is selected via the scheduler from a plurality of DUs of a radio access network in response to a random access process.

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. The processing module, module, processing circuit, processing circuitry, and/or processing unit can further include one or more interface devices for communicating data, signals and/or other information between the components of the processing module and further for communicating with other devices. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more examples have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more examples are used herein to illustrate one or more aspects, one or more features, one or more concepts, and/or one or more examples. A physical example of an apparatus, an article of manufacture, a machine, and/or of a process may include one or more of the aspects, features, concepts, examples, etc. described with reference to one or more of the examples discussed herein. Further, from figure to figure, the examples may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the examples. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

One or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition—requires "artificial" intelligence—i.e. machine/non-human intelligence.

One or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

One or more functions associated with the methods and/or processes described herein can be implemented in a system that is operable to electronically store digital data in a memory device. Such storage cannot practically be performed by the human mind because the human mind is not equipped to electronically store digital data.

One or more functions associated with the methods and/or processes described herein may operate to cause an action by a processing module directly in response to a triggering event—without any intervening human interaction between the triggering event and the action. Any such actions may be identified as being performed "automatically", "automatically based on" and/or "automatically in response to" such a triggering event. Furthermore, any such actions identified in such a fashion specifically preclude the operation of human activity with respect to these actions—even if the triggering event itself may be causally connected to a human activity of some kind.

While particular combinations of various functions and features of the one or more examples have been expressly described herein, other combinations of these features and functions are likewise possible. The present disclosure is not limited by the particular examples disclosed herein and expressly incorporates these other combinations.

What is claimed is:

1. A radio access network comprises:
 a master distributed unit (DU) associated with a plurality of radio units (RUs);
 another plurality of radio units (RUs); and
 a central scheduler configured to coordinate contemporaneous transmission to a user equipment UE via the plurality of RUs and the another plurality of RUs and contemporaneous reception from the user equipment UE via the plurality of RUs and the another plurality of RUs.

2. The radio access network of claim 1, wherein the central scheduler coordinates the contemporaneous transmission to the user equipment UE via the plurality of RUs and the another plurality of RUs and the contemporaneous reception from the user equipment UE via the plurality of RUs and the another plurality of RUs based on channel state information (CSI) received via the plurality of RUs and the another plurality of RUs.

3. The radio access network of claim 2, wherein the central scheduler receives the CSI corresponding to the plurality of RUs via the master DU.

4. The radio access network of claim 3, wherein the central scheduler receives the CSI corresponding to the another plurality of RUs via at least one other DU.

5. The radio access network of claim 4, wherein the master DU includes a DU data buffer for buffer for buffering the CSI corresponding to the another plurality of RUs and the at least one other DU includes at least one other DU data buffer for buffering the CSI corresponding to the another plurality of RUs.

6. The radio access network of claim 3, wherein the central scheduler receives the CSI corresponding to the another plurality of RUs via the master DU.

7. The radio access network of claim 4, wherein the central scheduler generates a resource allocation for resource blocks associated with the plurality of RUs and the another plurality of RUs.

8. The radio access network of claim 7, wherein the central scheduler generates precoders associated with the plurality of RUs and the another plurality of RUs.

9. The radio access network of claim 8, wherein the central scheduler communicates first network signaling with the Master DU that includes at least a portion of the resource allocation and at least a portion of the precoders.

10. The radio access network of claim 9, wherein the at least a portion of the resource allocation includes the resource allocation for resource blocks associated with the plurality of RUs and the another plurality of RUs and the at least a portion of the precoders includes the precoders associated with the plurality of RUs and the another plurality of RUs.

11. The radio access network of claim 9, wherein the central scheduler communicates second network signaling with the at least one other DU that includes at least another portion of the resource allocation and at least another portion of the precoders, wherein the at least another portion of the resource allocation includes the resource allocation for resource blocks associated the another plurality of RUs and the at least another portion of the precoders includes the precoders associated with the another plurality of RUs.

12. The radio access network of claim 9, wherein the master DU communicates network signaling with the at least one other DU that includes at least another portion of the resource allocation and at least another portion of the precoders, wherein the at least another portion of the resource allocation includes the resource allocation for resource blocks associated the another plurality of RUs and the at least another portion of the precoders includes the precoders associated with the another plurality of RUs.

13. The radio access network of claim 1, wherein the central scheduler engages in a resource negotiation with a second scheduler, and wherein the central scheduler is further configured to coordinate the contemporaneous transmission to a user equipment UE via the plurality of RUs and the another plurality of RUs and the contemporaneous reception from the user equipment UE via the plurality of RUs and the another plurality of RUs in accordance with the resource negotiation with the second scheduler.

14. The radio access network of claim 1, wherein the master DU is selected via the central scheduler from a plurality of DUs of the radio access network in response to a random access process.

15. A method comprises:
 obtaining, via a scheduler, channel state information (CSI) corresponding to a plurality of RUs associated with a master distributed unit (DU) and another plurality of RUs;
 allocating, via the scheduler and based on the channel state information (CSI), a resource allocation for resource blocks associated with the plurality of RUs and the another plurality of RUs;
 generating, via the scheduler and based on the channel state information (CSI), precoders associated with the plurality of RUs and the another plurality of RUs; and
 facilitating, via the master DU and based on the precoders and the resource allocation, contemporaneous transmission to a user equipment UE via the plurality of RUs and the another plurality of RUs and contemporaneous reception from the user equipment UE via the plurality of RUs and the another plurality of RUs.

16. The method of claim 15, wherein the scheduler coordinates the contemporaneous transmission to the user equipment UE via the plurality of RUs and the another plurality of RUs and the contemporaneous reception from the user equipment UE via the plurality of RUs and the another plurality of RUs based on channel state information (CSI) received via the plurality of RUs and the another plurality of RUs;
 wherein the scheduler receives the CSI corresponding to the plurality of RUs via the master DU;
 wherein the scheduler receives the CSI corresponding to the another plurality of RUs via at least one other DU;
 wherein the scheduler generates a resource allocation for resource blocks associated with the plurality of RUs and the another plurality of RUs and wherein the scheduler generates precoders associated with the plurality of RUs and the another plurality of RUs.

17. The method of claim 16, wherein the scheduler communicates first network signaling with the Master DU that includes at least a portion of the resource allocation and at least a portion of the precoders, wherein the at least a portion of the resource allocation includes the resource allocation for resource blocks associated with the plurality of RUs and the another plurality of RUs and the at least a portion of the precoders includes the precoders associated with the plurality of RUs and the another plurality of RUs; wherein the scheduler communicates second network signaling with the at least one other DU that includes at least another portion of the resource allocation and at least another portion of the precoders, wherein the at least another portion of the resource allocation includes the resource allocation for resource blocks associated the another plurality of RUs and the at least another portion of the precoders includes the precoders associated with the another plurality of RUs.

18. The method of claim 15, wherein the scheduler engages in a resource negotiation with a second scheduler, and wherein the scheduler is further configured to coordinate the contemporaneous transmission to a user equipment UE via the plurality of RUs and the another plurality of RUs and the contemporaneous reception from the user equipment UE via the plurality of RUs and the another plurality of RUs in accordance with the resource negotiation with the second scheduler.

19. The method of claim 15, wherein the master DU is selected via the scheduler from a plurality of DUs of a radio access network in response to a random access process.

20. A method comprises:
obtaining, at a scheduler, channel state information (CSI) corresponding to a plurality of RUs associated with a master distributed unit (DU) and another plurality of radio units (RUs) associated with at least one other DU, wherein the CSI associated with the another plurality of RUs is obtained via another scheduler or via the at least one other DU;
allocating, based on the CSI, a resource allocation for physical resource blocks (PRBs) associated with the plurality of RUs and the another plurality of RUs;
negotiating with the another scheduler to obtain PRBs of RUs controlled by the another scheduler;
generating, based on the CSI, precoders associated with the plurality of RUs and the another plurality of RUs; and
facilitating, via the master DU and based on the precoders and the resource allocation, contemporaneous transmission to a user equipment UE via the plurality of RUs and the another plurality of RUs and contemporaneous reception from the user equipment UE via the plurality of RUs and the another plurality of RUs.

* * * * *